(12) United States Patent
Myung et al.

(10) Patent No.: US 11,188,120 B2
(45) Date of Patent: Nov. 30, 2021

(54) FOLDABLE ELECTRONIC DEVICE

(71) Applicant: Samsung Electronics Co., Ltd., Gyeonggi-do (KR)

(72) Inventors: Jieun Myung, Gyeonggi-do (KR);
Bosoon Kang, Gyeonggi-do (KR);
Namsu Kim, Gyeonggi-do (KR);
Dahyun Lee, Gyeonggi-do (KR);
Jinhoo Lee, Gyeonggi-do (KR);
Jungwon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/095,837

(22) Filed: Nov. 12, 2020

(65) Prior Publication Data

US 2021/0149436 A1 May 20, 2021

(30) Foreign Application Priority Data

Nov. 15, 2019 (KR) .......................... 10-2019-0146910

(51) Int. Cl.
*G06F 1/16* (2006.01)
*E05D 7/04* (2006.01)
*H04M 1/02* (2006.01)

(52) U.S. Cl.
CPC .............. *G06F 1/162* (2013.01); *E05D 7/04* (2013.01); *G06F 1/1624* (2013.01);
(Continued)

(58) Field of Classification Search
CPC ...... G06F 1/162; G06F 1/1641; G06F 1/1624; G06F 1/1681; G06F 1/1652;
(Continued)

(56) References Cited

U.S. PATENT DOCUMENTS 9,348,450 B1 * 5/2016 Kim ..................... G06F 1/1681
10,043,421 B2 8/2018 Koo et al.
(Continued)

FOREIGN PATENT DOCUMENTS

KR 10-2016-0090471 A 8/2016
KR 10-2018-0116722 A 10/2018
(Continued)

OTHER PUBLICATIONS

International Search Report dated Feb. 18, 2021.

*Primary Examiner* — Rockshana D Chowdhury
(74) *Attorney, Agent, or Firm* — Cha & Reiter, LLC

(57) ABSTRACT

A foldable electronic device comprises a bending support part configured to be bent at a plurality of angles; a first sliding part and a second sliding part disposed under the bending support part and configured to slide in symmetrical directions with respect to each other, wherein at least a portion of one surface of the first sliding part and at least a portion of one surface of the second sliding part face each other when the bending support part is bent at one angle; a rail support part disposed over the bending support part and coupled with the first sliding part and the second sliding part and coupled with the bending support part, the rail support part being configured to support hinge motions and guide sliding motions of the first sliding part and the second sliding part; and a display disposed over the first sliding part, the bending support part, and the second sliding part.

20 Claims, 14 Drawing Sheets

(52) U.S. Cl.
CPC .......... *G06F 1/1641* (2013.01); *G06F 1/1681* (2013.01); *H04M 1/0222* (2013.01)

(58) Field of Classification Search
CPC ........ G06F 3/1423; G06F 2203/04102; H04M 1/0222; H04M 1/0268; H04M 1/022; H04M 1/0216; E05D 7/04; G09F 9/301
See application file for complete search history.

(56) References Cited

U.S. PATENT DOCUMENTS

| | | | |
|---|---|---|---|
| 10,268,245 B2 | 4/2019 | Lin | |
| 10,274,996 B2* | 4/2019 | Lin | ............ E05F 5/08 |
| 10,817,030 B2* | 10/2020 | Pelissier | ............ G06F 1/1681 |
| 10,827,633 B2 | 11/2020 | Yoo et al. | |
| 10,855,824 B2 | 12/2020 | Park et al. | |
| 10,856,430 B2 | 12/2020 | Yoo et al. | |
| 10,912,213 B2 | 2/2021 | Woo | |
| 2014/0111954 A1* | 4/2014 | Lee | ............ G06F 1/1652 361/749 |
| 2015/0055287 A1* | 2/2015 | Seo | ............ H04M 1/0216 361/679.27 |
| 2016/0212840 A1 | 7/2016 | Koo et al. | |
| 2017/0192460 A1* | 7/2017 | Watanabe | ............ G09F 9/00 |
| 2017/0315588 A1* | 11/2017 | Aurongzeb | ............ G06F 1/1681 |
| 2018/0210511 A1 | 7/2018 | Lin | |
| 2018/0324964 A1 | 11/2018 | Yoo et al. | |
| 2019/0032380 A1 | 1/2019 | Wu et al. | |
| 2019/0200470 A1* | 6/2019 | Woo | ............ E05D 11/10 |
| 2019/0268456 A1 | 8/2019 | Park et al. | |
| 2020/0137908 A1 | 4/2020 | Yoo et al. | |
| 2020/0396852 A1 | 12/2020 | Yoo et al. | |
| 2021/0029232 A1 | 1/2021 | Park et al. | |

FOREIGN PATENT DOCUMENTS

| | | |
|---|---|---|
| KR | 10-2018-0122210 A | 11/2018 |
| KR | 10-2019-0001864 A | 1/2019 |

* cited by examiner

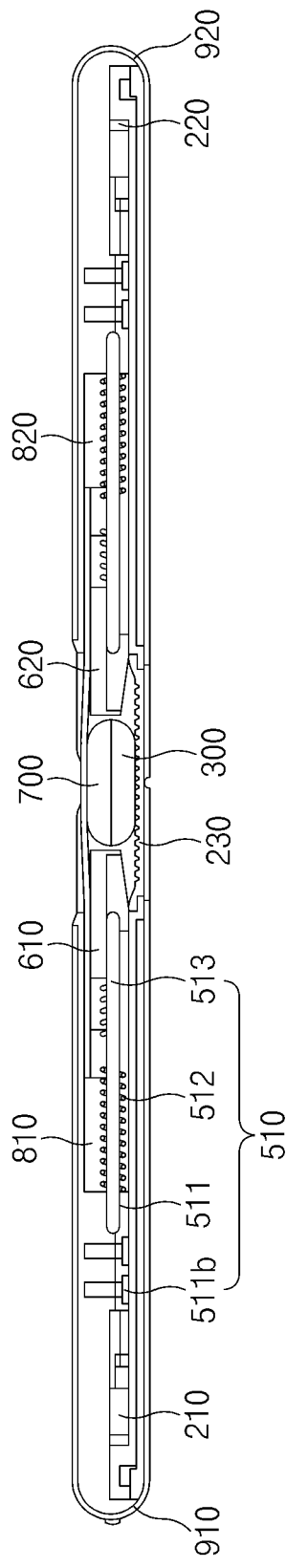
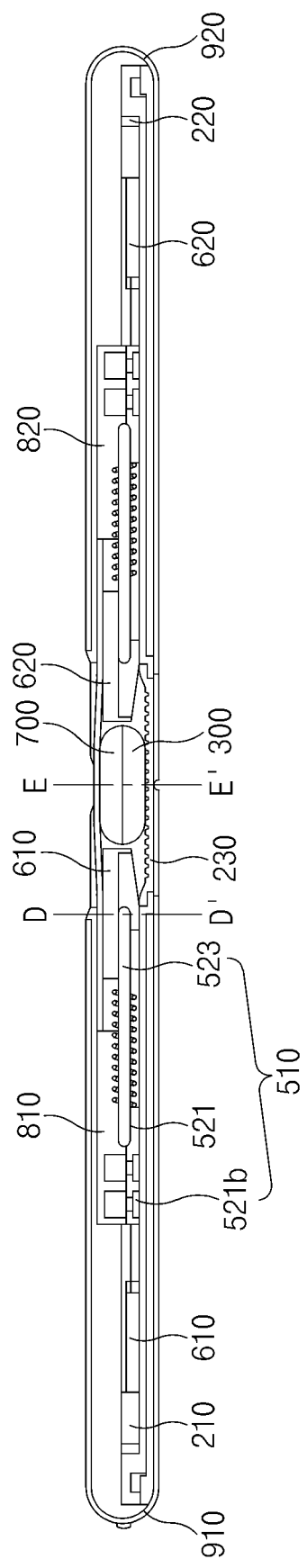
FIG. 6A
FIG. 6B

FOLDABLE ELECTRONIC DEVICE

CROSS-REFERENCE TO RELATED APPLICATION(S)

This application is based on and claims priority under 35 U.S.C. § 119 to Korean Patent Application No. 10-2019-0146910, filed on Nov. 15, 2019, in the Korean Intellectual Property Office, the disclosure of which is incorporated by reference herein its entirety.

BACKGROUND

1. Field

The disclosure relates to a foldable electronic device designed to be in-folded and out-folded.

2. Description of Related Art

Recently, portable electronic devices equipped with displays having various sizes have been manufactured in consideration of various purposes such as portability, availability, and the like. With portable devices, a tradeoff occurs between screen size and portability. Generally, larger displays provide a more pleasing user experience. However, larger displays also increase the size of the device. In general, the device should be small enough to fit in the pocket of clothing, such as a pant or vest pocket, or a purse. As a result, the display may be limited in size.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, foldable electronic device comprises a bending support part configured to be bent at a plurality of angles; a first sliding part and a second sliding part disposed under the bending support part and configured to slide in symmetrical directions with respect to each other, wherein at least a portion of one surface of the first sliding part and at least a portion of one surface of the second sliding part face each other when the bending support part is bent at one angle; a rail support part disposed over the bending support part and coupled with the first sliding part and the second sliding part and coupled with the bending support part, the rail support part being configured to support hinge motions and guide sliding motions of the first sliding part and the second sliding part; and a display disposed over the first sliding part, the bending support part, and the second sliding part.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A is a view illustrating one example of a section of the foldable electronic device taken along line B-B' of FIG. 5;

FIG. 6B is a view illustrating one example of a section of the foldable electronic device taken along line C-C' of FIG. 5;

With regard to the description of the drawings, identical or similar reference numerals may be used to refer to identical or similar components.

DETAILED DESCRIPTION

Figure 1:
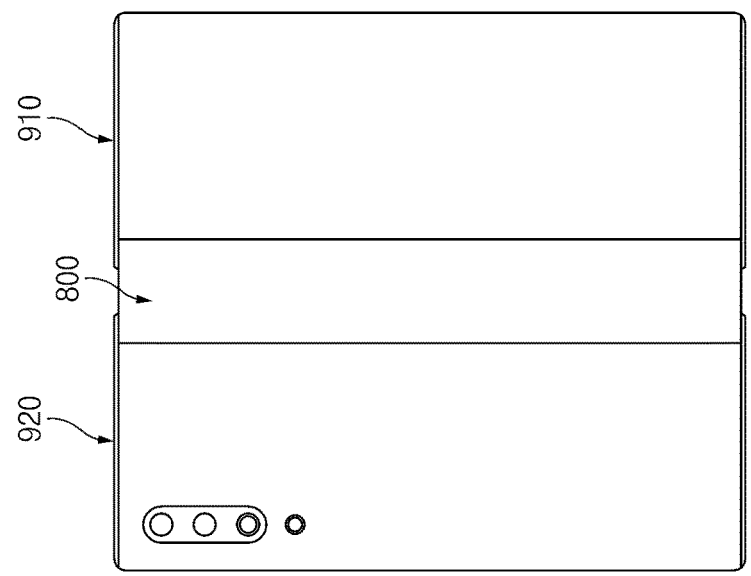
FIG. 1 is a view illustrating one example of the exterior of a foldable electronic device according to an embodiment.
Figure 1:
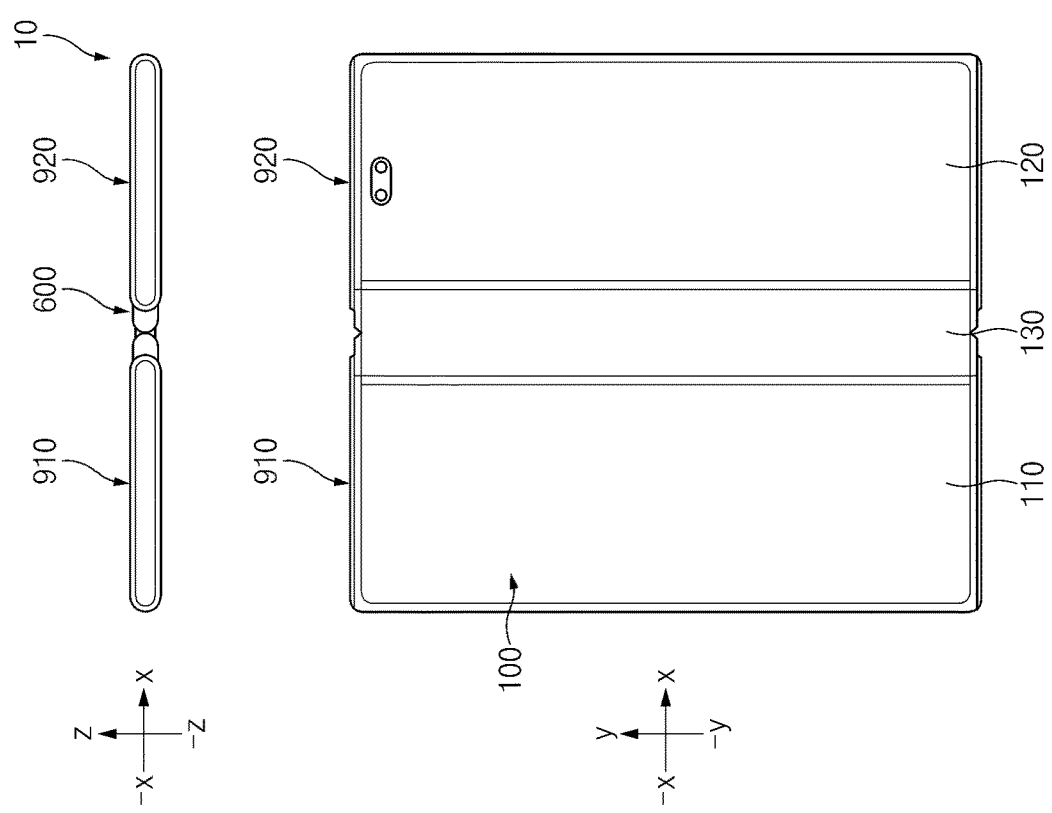

Hereinafter, certain embodiments of the disclosure may be described with reference to accompanying drawings. Accordingly, those of ordinary skill in the art will recognize that modifications, equivalents, and/or alternatives on the certain embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in certain embodiments of the disclosure. In some cases, even if terms are terms which are defined in the disclosure, they may not be interpreted to exclude embodiments of the disclosure.

An electronic device according to certain embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to certain embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

Hereinafter, electronic devices according to certain embodiments will be described with reference to the accompanying drawings. In the disclosure, the term "user" may refer to a person who uses an electronic device or may refer to a device (e.g., an artificial intelligence electronic device) that uses the electronic device.

An electronic devices with size-adjustable displays allow for the user to have a large display, while at the same time, the electronic device is compact enough to be portable. For example, a foldable electronic device includes at least two housings and enables increasing the display size by unfolding.

A foldable electronic device may have a foldable structure that is folded only in one direction, and therefore the usability is restricted.

Certain embodiments presented herein, provide an electronic device that can be folded, such that the front surface of the housings can be folded to face each other or the rear surface of the housings can be folded to face each other.

Aspects of the disclosure are to address at least the above-mentioned problems and/or disadvantages and to provide at least the advantages described below. Accordingly, an aspect of the disclosure is to provide a foldable electronic device for supporting an in-folded state in which a display is located inside the foldable electronic device while at least two housings are folded and an out-folded state in which the display is located on the outside of the foldable electronic device while the at least two housings are folded. FIG. 1 is a view illustrating one example of the exterior of a foldable electronic device 10 which can be folded in two directions, according to an embodiment.

Referring to FIG. 1, the foldable electronic device 10 according to an embodiment may include a display 100 (or, a flexible display, at least part of which is bent), a first sliding part 910 (or, a first housing or a first frame), a second sliding part 920 (or, a second housing or a second frame), a bending support part 800, and a rail support part 600.

The first sliding part 910 and the second sliding part 920 can be connected by the rail supporting part 600. The first sliding part 910 and the second sliding part 920 can slide laterally with respect to the rail supporting part 600, such as when the user folds, unfolds, or reverse folds the electronic device 10. The bending support part 800 can be disposed in the rail support part 600. The bending support part 800 can be made of flexible or elastic material. The first housing part 910 and the second housing part form the periphery of the display 100.

The foldable electronic device 10 can be folded such either surface of the first housing and second housing can meet. At least part of the display 100 may be bent. For example, a central portion of the display 100 may be folded with respect to the z-axis direction or the −z-axis direction. At least part of a first display area 110 of the display 100 may be disposed on a surface of the first sliding part 910. At least part of a second display area 120 may be disposed on a surface the second sliding part 920, and a third display area 130 may be disposed between the first sliding part 910 and the second sliding part 920. At least part of a central portion of the rail support part 600 and at least part of a central portion of the bending support part 800 may be disposed under the third display area 130. The first display area 110 may face the second display area 120, or may face away from the second display area 120, depending on a direction in which the foldable electronic device 10 is folded. Alternatively, the first display area 110 and the second display area 120 may maintain a specified mounting angle therebetween. At least a part of components related to driving the display 100 may be disposed in the first sliding part 910 and the second sliding part 920.

The first sliding part 910 may move within the rail support part as the electronic device is folded. The first sliding part 910 may surround part of the periphery of the first display area 110 of the display 100. Part of a support plate that supports at least part of the display 100 during a folding operation of the foldable electronic device 10, part of the rail support part 600, and part of the bending support part 800 may be disposed inside the first sliding part 910. The first sliding part 910 may be moved by a specified distance in the −x-axis direction (or, the direction from at least one side of the third display area 130 to one side of the periphery of the first display area 110) while the display 100 is folded in a first direction (e.g., the direction in which the first display area 110 and the second display area 120 are disposed to face each other). The first sliding part 910 may be moved by the specified distance in the x-axis direction (or, the direction from one side of the periphery of the first display area 110 to the third display area 130) while the display 100 is folded in a second direction (e.g., the direction in which the first display area 110 and the second display area 120 are disposed to face away from each other).

The second sliding part 920 may move within the rail support part as the electronic device is folded. The second sliding part 920 may be surround part of the periphery of the second display area 120 of the display 100. Another part of the support plate that supports at least part of the display 100 during the folding operation of the foldable electronic device 10, another part of the rail support part 600, and another part of the bending support part 800 may be disposed inside the second sliding part 920. The second sliding part 920 may be moved by the specified distance in the x-axis direction (or, the direction from at least one side of the third display area 130 to one side of the periphery of the second display area 120) while the display 100 is folded in the first direction (e.g., the direction in which the first display area 120 and the second display area 120 are disposed to face each other). The second sliding part 920 may be moved by the specified distance in the −x-axis direction (or, the direction from one side of the periphery of the second display area 120 to the third display area 130) while the display 100 is folded in the second direction (e.g., the direction in which the first display area 110 and the second display area 120 are disposed to face away from each other).

At least one rail structure connected with the first sliding part 910 and the second sliding part 920 and at least one rail structure connected with the bending support part 800 may be disposed on the rail support part 600. The rail support part 600 may include a first rail support part coupled (or connected) with the first sliding part 910 and a second rail support part coupled with the second sliding part 920.

The bending support part 800 may be disposed between the rail support part 600 and the sliding structure (e.g., the first sliding part 910 and the second sliding part 920) and may be coupled (or connected) with the rail support part 600. The bending support part 800 may be formed of a material (e.g., rubber, flexible plastic, a polymer, or a flexible metal panel) having elasticity or flexibility such that the central portion thereof is folded depending on a folding operation.

While the foldable electronic device 10 having the above-described structure supports an in-folding operation in the z-axis direction and an out-folding operation in the −z-axis direction, the first sliding part 910 and the second sliding part 920 may be moved in the first direction or the second direction with respect to a central portion to allow movement of a sliding structure required depending on folding of the display 100. For example, in the in-folding operation, the first sliding part 910 and the second sliding part 920 may slide in directions away from the central portion (e.g., the central portion of the display 100, or the central portion of the foldable electronic device 10 with respect to the vertical axis) and may surround the in-folded display 100 from the outside. Alternatively, in the out-folding operation, the first sliding part 910 and the second sliding part 920 may move in directions toward the central portion and may support a bent portion of the out-folded display 100.

Figure 2:
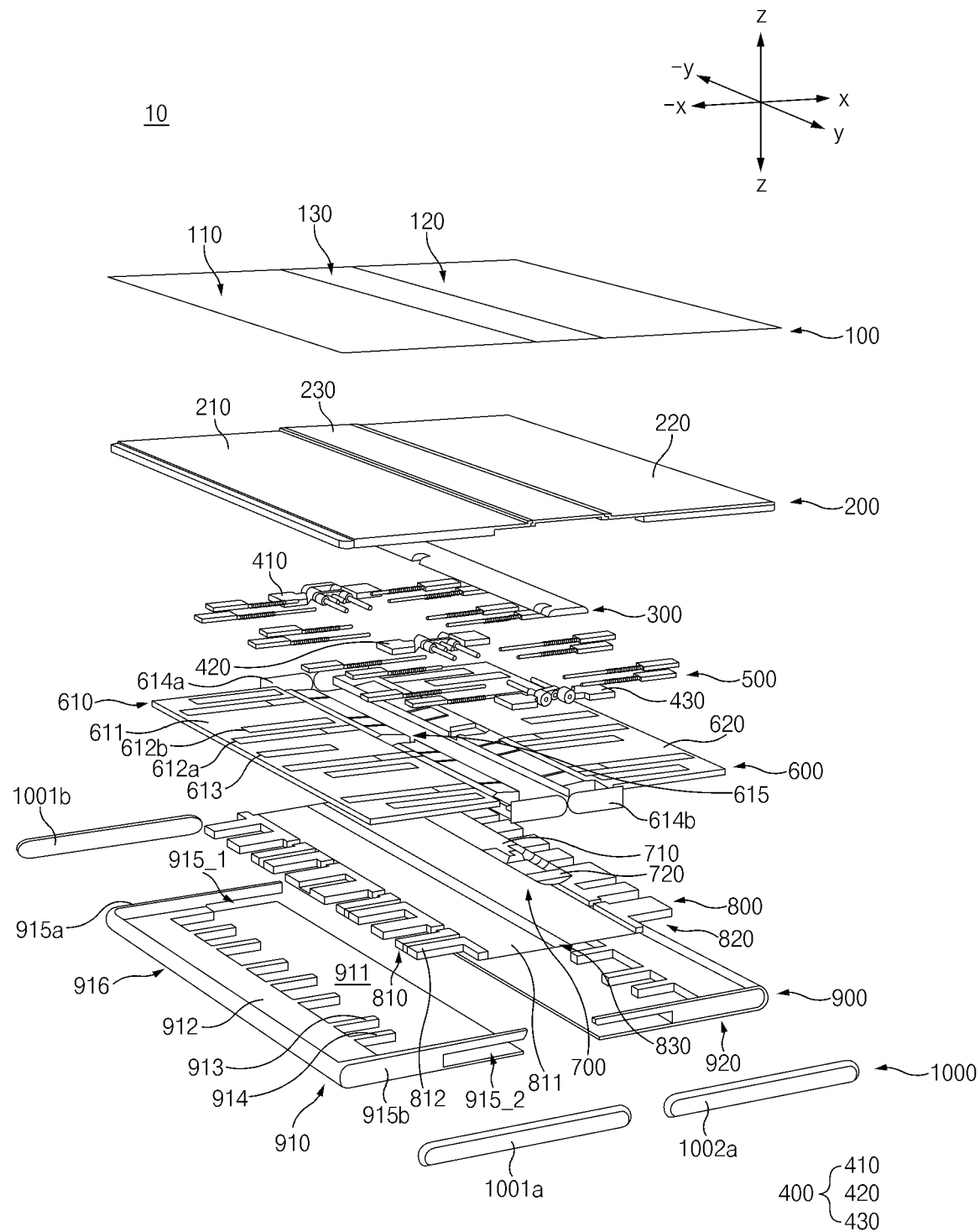
FIG. 2 is an exploded perspective view of the foldable electronic device according to an embodiment when viewed in one direction.
Figure 3:
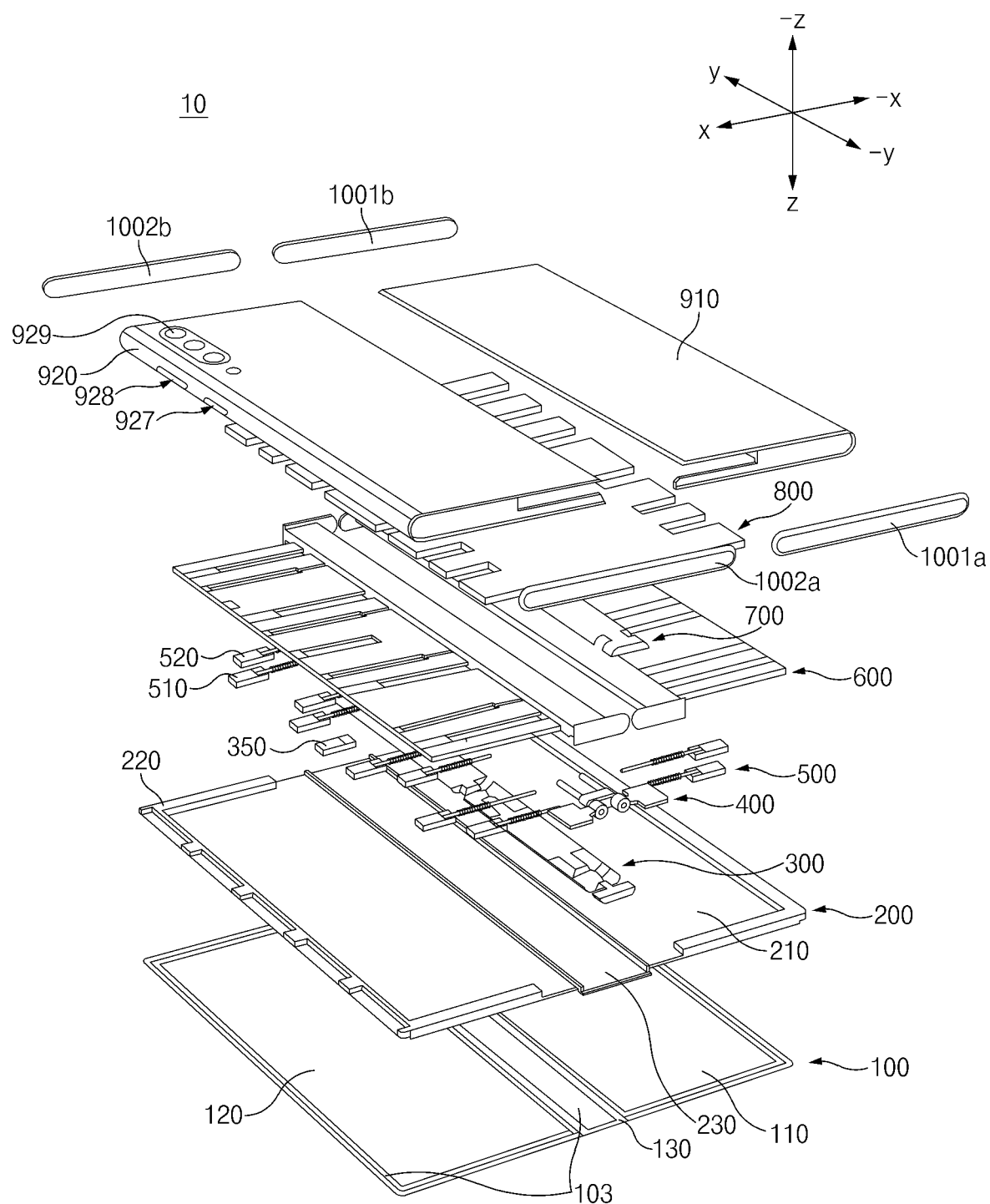
FIG. 3 is an exploded perspective view of the foldable electronic device according to an embodiment when viewed in a different direction.

FIG. 2 is an exploded perspective view of the foldable electronic device according to an embodiment when viewed in one direction, and FIG. 3 is an exploded perspective view of the foldable electronic device according to an embodiment when viewed in the opposite direction.

Referring to FIGS. 2 and 3, the foldable electronic device 10 may include the display 100, a support plate 200, a first hinge housing 300, hinge structures 400, a rail structure 500, the rail support part 600, a second hinge housing 700, the bending support part 800, and the first sliding part 910 and second sliding part 920 forming a sliding structure 900.

The first sliding part 910 and the second sliding part 920 are disposed in the rail structure 600, such that the rail structure can guide lateral movement of the first sliding part 910 and the second sliding part 920. The rail structure includes first rail support part 610 and second rail support part 620 that are hingably connected. The bending support 800 is disposed between the first sliding part 910 and the second sliding support 920. The bending support 800 is bendable but is rigid enough to prevent bending by force applied by the user. As a result, when the fold angle of the bending support 800 is changed, the first sliding part 910 and the second sliding part 920 are urged to slide symmetrically with respect to each other.

As described above with reference to FIG. 1, at least the central portion of the display 100 may be folded inwardly in the z-axis direction, or may be folded outwardly in the −z-axis direction, with respect to the y-axis and the −y-axis. The display 100 may include the first display area 110, the second display area 120, and the third display area 130 disposed between the first display area 110 and the second display area 120. An edge of the first display area 110 that faces the x-axis direction may be connected with an edge of the third display 130 that faces the −x-axis direction. An edge of the third display area 130 that faces the x-axis direction may be connected with an edge of the second display 120 that faces the −x-axis direction. The display 100 may include a panel layer in which a plurality of pixels for displaying a screen are arranged in a matrix form, a touch sensor layer placed on the panel layer, and a protective layer placed on the touch sensor layer. According to an embodiment, the display 100 may include at least one of a cushion layer, a heat dissipation layer, or an electromagnetic induction panel that is placed under the panel layer. Furthermore, the display 100 may further include at least one adhesive layer disposed between the above-described layers. According to an embodiment, an adhesive member 103 (e.g., an adhesive strap) may be disposed on at least part of the periphery of a rear surface (e.g., a surface facing the −z-axis direction) of the display 100 (e.g., on the periphery of a rear surface of the first display area 110 and the periphery of a rear surface of the second display area 120). According to certain embodiments, the adhesive member 103 may be disposed on at least part of a central portion of the rear surface of the display 100 (e.g., a rear surface of the third display area 130).

The support plate 200 may include a first support plate 210 connected to a second support plate 220 by a third support plate 230. The first support plate may be disposed under the first display area 110, the second support plate 220 may be disposed under the second display area 120, and the third support plate 230 may be disposed under the third display area 130. The third support plate 230 may be formed of material that is more elastic and less rigid as compared to the first support plate 210 and the second support plate 220.

The support plate 200 may be disposed under the display 100 and may support the display 100. The support plate 200 may include, for example, a first support plate 210, a second support plate 220, and a third support plate 230. The first support plate 210 may be disposed under the first display area 110 and may support the first display area 110. An adhesive layer may be disposed in at least a partial area between the first display area 110 and the first support plate 210. The second support plate 220 may be disposed under the second display area 120 and may support the second display area 120. An adhesive layer may be disposed between the second support plate 220 and the second display area 120. The third support plate 230 may be disposed between the first support plate 210 and the second support plate 220. The third support plate 230 may be disposed under the third display area 130 and may support the third display area 130. An upper surface (a surface facing the z-axis direction) of the third support plate 230 may be formed to be flat to support the third display area 130. A lower surface (a surface facing the −z-axis direction) of the third support plate 230 may be provided in a corrugated or bumpy form for an increase in elongation depending on a folding operation. The first support plate 210 and the second support plate 220 may have a specified hardness. For example, at least parts of the first support plate 210 and the second support plate 220 may be formed of a metal sheet. The third support plate 230 may be formed of a material (e.g., rubber, flexible plastic, a polymer, or the like) that is not damaged or deformed by a folding operation. The third support plate 230 may be continuously connected with the first support plate 210 and the second support plate 220 and may be formed without a step. According to certain embodiments, the third support plate 230 may be formed to further protrude by a predetermined height in the z-axis direction beyond the first support plate 210 and the second support plate 220.

The first hinge housing 300 may be disposed under the third support plate 230 and may be disposed to cover upper surfaces (surfaces facing the z-axis direction) of the hinge structures 400. The first hinge housing 300 may have a cavity on at least one side thereof, or may have a shape corresponding to the hinge structures 400, such that the hinge structures 400 are mounted in the first hinge housing 300. An adhesive member 301 (e.g., an adhesive tape) may be disposed on an upper surface (a surface facing the z-axis direction) of the first hinge housing 300. The adhesive member 301 may serve to fix the first hinge housing 300 to the third support plate 230. The first hinge housing 300 may have, on one side thereof, at least one slit through which at least parts of the hinge structures 400 protrude to the outside.

Sides of the hinge structures 400 may be mounted in the first hinge housing 300, and the hinge structures 400 may be coupled with the rail support part 600. The hinge structures 400 may include, for example, a first hinge structure 410, a second hinge structure 420, and a third hinge structure 430. The first hinge structure 410 may be disposed to be biased in the y-axis direction. The second hinge structure 420 may be disposed on the center of the vertical axis (the axis parallel to the y-axis and the −y-axis) of the foldable electronic device 10. The third hinge structure 430 may be disposed to be biased in the −y-axis direction. The first hinge structure 410, the second hinge structure 420, and the third hinge structure 430 may all have the same structure. The direction in which the first hinge structure 410 is disposed may be opposite to the direction in which the third hinge structure 430 is disposed. Although FIGS. 2 and 3 illustrate an example that the three hinge structures 400 are disposed, the disclosure is not limited thereto. For example, two hinge structures 400 or four or more hinge structures 400 may be disposed depending on the size of the foldable electronic device 10. The hinge structures 400 may connect a first rail support part 610 and a second rail support part 620.

A plurality of rail structures 500 may be disposed. The rail structures 500 may include first rail structures 510 coupled to the sliding structure 900 and second rail structures 520 coupled to the bending support part 800. The first rail structures 510 and the second rail structures 520 may include similar components. The rail structures 510 and the second rail structures 520 may be alternately disposed to substantially uniformly distribute pressure generated during a folding operation. According to certain embodiments, as the bending support part 800 is disposed inside the sliding structure 900, central rods of the first rail structures 510 may be formed to be longer than central rods of the second rail structures 520. The distance by which the first rail structures 510 and the second rail structures 520 move may vary depending on a direction in which the foldable electronic device 10 is folded. For example, the first rail structures 510 coupled with the sliding structure 900 may move a longer distance in an in-folded state than in an out-folded state.

The rail support part 600 may include the first rail support part 610 disposed under the first support plate 210 and the second rail support part 620 disposed under the second support plate 220. An empty space in which the first hinge housing 300 is disposed may be disposed between the first rail support part 610 and the second rail support part 620. The first rail support part 610 and the second rail support part 620 may have substantially the same structure and may be disposed to face away from each other. For example, the first rail support part 610 may include a rail support part body 611, a first mounting portion 612a, a second mounting portion 612b, a third mounting portion 613, a first side guard 614a, a second side guard 614b, and hinge coupling portions 615. Similarly, the second rail support part 620 may include a rail support part body, a first mounting portion, a second mounting portion, a third mounting portion, a first side guard 624a, a second side guard 624b, and hinge coupling portions.

The rail support part body 611 may have an area corresponding to the first display area 110 or an area corresponding to the first support plate 210 and may have a predetermined thickness such that the mounting portions are formed. Part (e.g., an edge facing the x-axis direction) of the rail support part body 611 on which the hinge coupling portions 615 are disposed may be formed to be thicker than another area to resist a force generated while the rail support part body 611 is coupled (or connected) with the hinge structures 400 and thereafter supports a hinge motion. The rail support part body 611 according to certain embodiments may have a uniform thickness.

A plurality of first mounting portions 612a may be formed on the rail support part body 611 so as to be spaced apart from each other at predetermined intervals in a direction across the x-axis and the −x-axis. Each of the first mounting portions 612a, for example, may have a form corresponding to the size of at least part of at least one first rail structure 510 coupled with the sliding structure 900 (e.g., the first sliding part 910), or may have a step formed on an edge portion thereof such that the first rail structure 510 is movable. The first mounting portion 612a may have an opening formed through a central portion thereof for a coupling of the first rail structure 510 and the first sliding part 910. Furthermore, the first mounting portion 612a may include a hole formed therein in the x-axis direction, and at least part of the central rod of the first rail structure 510 may be mounted in the hole. For coupling with the first sliding part 910, the first mounting portion 612a may be disposed to be aligned with a protruding shape of the first sliding part 910.

The second mounting portion 612b may be formed to further protrude in the −x-axis direction, compared with the first mounting portion 612a. The second mounting portion 612b may have substantially the same shape as the first mounting portion 612a. For example, the second mounting portion 612b may have an opening formed through a central portion thereof such that a step is formed on the periphery. The second mounting portion 612b may be disposed to be coupled with a protruding shape of the bending support part 800. The third mounting portion 613 may be disposed in a central portion of the rail support part body 611. For example, a stopper 350 may be mounted in the third mounting portion 613. The third mounting portion 613 may include at least one side recess that supports a detent operation of the stopper 350 mounted.

At least one stopper 350 may be coupled with the first sliding part 910 (or, one side of the bending support part 800). One side of the stopper 350 may be mounted in the third mounting portion 613, and the stopper 350 may be moved in a direction from the x-axis to the −x-axis. In the drawings, the foldable electronic device 10 is illustrated in the form including the stopper 350 coupled with the first sliding part 910. However, the disclosure is not limited thereto. For example, the foldable electronic device 10 of the disclosure may include only one stopper 350, or may include three or more stoppers depending on design. In a case where three or more stoppers are disposed, third mounting portions 613 may be additionally formed to correspond to the stoppers.

The first side guard 614a may be disposed at an edge of the rail support part body 611 that faces the y-axis direction. Alternatively, the first side guard 614a may be disposed to correspond to the positions where the first hinge housing 300 and the second hinge housing 700 are disposed. The first side guard 614a may serve to hide at least parts of side surfaces of the first hinge housing 300 and the second hinge housing 700 that face the y-axis direction such that the at least parts of the side surfaces are not visible from the outside. The first guard 614a may serve to guide at least parts of side covers 1001a, 1001b, 1002a, and 1002b of the sliding structure 900. The first side guard 614a may be formed to protrude from the rail support part body 611 toward the central portion. The second side guard 614b may be formed to protrude toward the central portion from an edge of the rail support part body 611 that faces the −y-axis direction. At least part of the second side guard 614b may be disposed to hide at least parts of side surfaces of the first hinge housing 300 and the second hinge housing 700 that face the −y-axis direction and may serve to guide at least parts of the side covers 1001a, 1001b, 1002a, and 1002b of the sliding structure 900. Similarly to the first rail support part 610 including the first side guard 614a and the second side guard 614b, the second rail support part 620 may include the first side guard 624a and the second side guard 624b. An end of the first side guard 614a of the first rail support part 610 that faces the x-axis direction may be disposed to face an end of the first side guard 624a of the second rail support part 620 that faces the −x-axis direction. Similarly, an end of the second side guard 614b of the first rail support part 610 that faces the x-axis direction may be disposed to face an end of the second side guard 624b of the second rail support part 620 that faces the −x-axis direction. The first side guard 624a and the second side guard 624b disposed on the second rail support part 620 may hide or surround side surfaces of the hinge housings 300 and 700 disposed in the empty space of the rail support part 600.

The hinge coupling portions 615 may be coupled with parts of the hinge structures 400. Each of the hinge coupling portions 615 may be formed to have a step and may include at least one coupling hole for coupling with the corresponding hinge structure 400. As many hinge coupling portions 615 as the hinge structures 400 may be formed. For example, in a case where three hinge structures 400 are disposed, three hinge coupling portions 615 may be disposed.

At least parts of the hinge structures 400 may be mounted on hinge mounting portions 720. The second hinge housing 700 may be fastened with the first hinge housing 300 in the empty space formed in the central portion of the rail support part 600. The second hinge housing 700 may have the same shape as the first hinge housing 300. For example, the hinge mounting portions 720 corresponding to the shapes of the hinge structures 400 may be formed on at least parts of the inside of the second hinge housing 700 and may be coupled with the hinge structures 400. A hinge housing body 710 of the second hinge housing 700 may face a body of the first hinge housing 300. When the second hinge housing 700 is coupled with the first hinge housing 300, parts of the hinge structures 400 may be disposed inside the second hinge housing 700, and the remaining parts (e.g., wings) of the hinge structures 400 may protrude to the outside. At least part of an outer surface of the second hinge housing 700 may be fixed to the bending support part 800 through an adhesive member 805 (e.g., an adhesive tape) provided on the bending support part 800.

The bending support part 800 may be disposed under the rail support part 600. The bending support part 800 may be formed to be smaller than the rail support part 600 or the support plate 200. The bending support part 800 may include a first bending support part 810 coupled to the first rail support part 610, a second bending support part 820 coupled to the second rail support part 620, and a bending part 830 bent in the first direction or the second direction in a folding operation. With the exception that the first bending support part 810 and the second bending support part 820 are disposed in opposite directions, the first bending support part 810 and the second bending support part 820 may have substantially the same shape and may be symmetrically disposed with respect to a virtual line parallel to the y-axis and the −y-axis. An edge of the first bending support part 810 that faces the x-axis direction may be connected to the bending part 830, and an edge of the bending part 830 that faces the x-axis direction may be connected to an edge of the second bending support part 820 that faces the −x-axis direction. The first bending support part 810 may include, for example, a bending support part body 811 and bending bumpy portions 812 extending from the bending support part body 811 in the −x-axis direction and having a rampart shape. The bending bumpy portions 812 may be formed to protrude by a predetermined height in the z-axis direction. The bending bumpy portions 812 may be formed to correspond to the positions of the first mounting portions 612a formed on the rail support part 600. Similarly to the first bending support part 810, the second bending support part 820 may include a bending support part body and bending bumpy portions. The bending part 830 may be disposed between the first bending support part 810 and the second bending support part 820, and the adhesive member 805 disposed parallel to the y-axis direction may be disposed on a central portion of the bending part 830. The bending part 830 may be brought into contact with part of a central portion of a rear surface of the second hinge housing 700. The adhesive member 805 may fix the part of the central portion of the rear surface of the second hinge housing 700 to the bending part 830.

The sliding structure 900 may include the first sliding part 910 disposed under the first display area 110, the second sliding part 920 disposed under the second display area 120, and the side covers 1001a, 1002a, 1001b, and 1002b. The first sliding part 910 may have the same structure as the second sliding part 920. According to certain embodiments, a camera module 929, a first button hole 927, and a second button hole 928 may be disposed on one side of the second sliding part 920. The camera module 929 may be disposed on one side of a rear surface (e.g., a surface facing the −z-axis direction) of the second sliding part 920. The first button hole 927 and the second button hole 928 may be disposed on a side surface (e.g., a surface facing the x-axis direction) of the second sliding part 920. A volume button and a power key may be disposed in the first button hole 927 and the second button hole 928 so as to further protrude in the x-axis direction beyond the side surface of the second sliding part 920.

The first sliding part 910 may include a base plate 911, a step portion 912, sliding bumpy portions 913 and 914, a first sidewall 915a, a second sidewall 915b, a third sidewall 916, a first guard hole 915_1 (or, a guard recess), and a second guard hole 915_2. Similarly, the second sliding part 920 may include a base plate, a step portion, sliding bumpy portions, a first sidewall, a second sidewall, a third sidewall, a first guard hole (or, a guard recess), and a second guard hole. The base plate of the second sliding part 920 may be disposed to be spaced apart from the base plate 911 of the first sliding part 910 by a predetermined interval (e.g., the thickness of the first hinge housing 300 and the second hinge housing 700 or the width of the hinge housings 300 and 700 in the x-axis direction). The interval between the base plate of the second sliding part 920 and the base plate 911 of the first sliding part 910 may vary depending on a folding operation.

The first base plate 911 may be disposed under the first bending support part 810 and may support a rear surface of the first bending support part 810. The first sidewall 915a may be disposed at an edge of the base plate 911 that faces the y-axis direction, and the second sidewall 915b may be disposed at an edge of the base plate 911 that faces the −y-axis direction. The step portion 912 and the sliding bumpy portions 913 and 914 may be disposed above the base plate 911 in the −x-axis direction.

The step portion 912 may be formed to be thicker than the base plate 911. According to certain embodiments, although the step portion 912 is illustrated as having a flat shape, at least one seating space may be formed in the step portion 912, and at least one component (e.g., a battery, a printed circuit board, an antenna, a camera, or at least one sensor) associated with operation of the foldable electronic device 10 may be disposed in the corresponding space. The third sidewall 916 may be disposed at an edge of the step portion 912 that faces the −x-axis direction. The sliding bumpy portions 913 and 914 may be disposed at an edge of the step portion 912 that faces the x-axis direction.

The sliding bumpy portions 913 and 914 may protrude from the edge of the step portion 912 by a predetermined length in the x-axis direction. The sliding bumpy portions 913 and 914 may be formed to be spaced apart from each other at a predetermined interval and may have the same height as at least part of the step portion 912. At least a part of the sliding bumpy portions 913 and 914 may be disposed to correspond to the second mounting portion 612b formed on the rail support part 600. The sliding bumpy portions 913 and 914 may be formed to be engaged with the bending bumpy portions 812.

The first sidewall 915a may be disposed at the edge of the base plate 911 that faces the y-axis direction and may form a predetermined angle (e.g., 90 degrees) with the base plate 911. An edge on one side of the first sidewall 915a may be connected with one side of the third sidewall 916. The second sidewall 915b may be disposed at the edge of the base plate 911 that faces the −y-axis direction and may form a predetermined angle (e.g., 90 degrees) with the base plate 911. An edge on one side of the second sidewall 915b may be connected with an opposite side of the third sidewall 916. One surface of the first sidewall 915a may face one surface of the second sidewall 915b. The first guard hole 915_1 may be formed on one side of the first sidewall 915a, and the second guard hole 915_2 may be formed on one side of the second sidewall 915b. The first side guard 614a may be disposed in the first guard hole 915_1, and the second side guard 614b may be disposed in the second guard hole 915_2.

The first side cover 1001b may be disposed on an outer surface (e.g., a surface facing the y-axis direction) of the first sidewall 915a, and the second side cover 1001a may be disposed on an outer surface (e.g., a surface facing the −y-axis direction) of the second sidewall 915b. The third side cover 1002b may be disposed on an outer surface of the first sidewall of the second sliding part 920, and the fourth side cover 1002a may be disposed on an outer surface of the second sidewall of the second sliding part 920. The side covers 1001a, 1002a, 1001b, and 1002b may be formed to be longer in the x-axis direction than in the z-axis direction, and edges thereof may be rounded. An adhesive member may be disposed between the side covers 1001a, 1002a, 1001b, and 1002b and the sidewalls.

Figure 4:
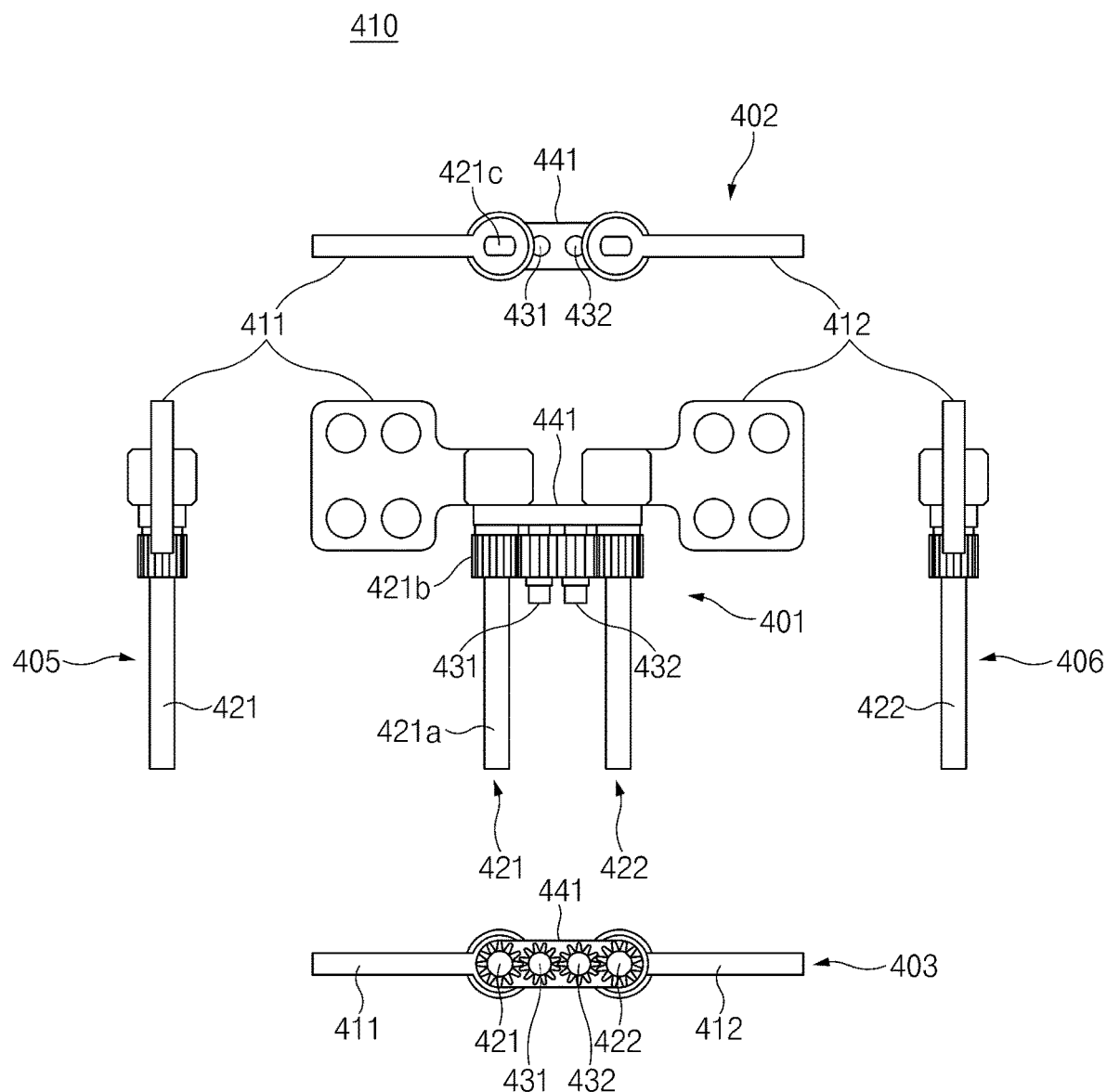
FIG. 4 is a view illustrating one example of a hinge structure according to an embodiment.

FIG. 4 is a view illustrating one example of a hinge structure according to an embodiment.

Referring to FIG. 4, the first hinge structure 410 may include a first wing 411, a second wing 412, a first rotary gear part 421, a second rotary gear part 422, a first idle gear 431, a second idle gear 432, and a fixing part 441. In the drawing, state 401 represents the front of the first hinge structure 410, and state 402 represents the top of the first hinge structure 410. State 403 represents the bottom of the first hinge structure 410, state 405 represents the left side of the first hinge structure 410, and state 406 represents the right side of the hinge structure 410. Although the first hinge structure 410 is illustrated as an example in the drawing, the above-described second hinge structure 420 may have the same structure as the first hinge structure 410.

The first wing 411 may include a connecting portion connected to the first rotary gear part 421 so as to be rotatable and a wing portion that extends from the connecting portion and that is fastened with the hinge coupling portion 615 of the first rail support part 610. The wing portion may include at least one hole for coupling with the hinge coupling portion 615. A screw may be inserted into the hole and may fix the first wing 411 to the hinge coupling portion 615. The connecting portion of the first wing 411 may include a connecting hole formed in a direction perpendicular to the direction in which the hole is formed in the wing portion. One end of the first rotary gear part 421 may be inserted into the connecting hole. At least part of the connecting hole may be formed in a straight form and may support the connecting portion such that the first wing 411 rotates as the first rotary gear part 421 rotates. The second wing 412 may be formed to be identical or similar to the first wing 411. The second wing 412 may be coupled with the second rotary gear part 422 and may rotate as the second rotary gear part 422 rotates. The second wing 412 may be fastened to the hinge coupling portion 615 of the second rail support part 620. Accordingly, the second sliding part 920 may rotate as the second rotary gear part 422 rotates.

The first rotary gear part 421 may include a central shaft 421*a* having a predetermined length, a first rotary gear 421*b* formed on a portion of the central shaft 421, and a wing connecting portion 421*c* connected with the first rotary gear 421*b*. The first rotary gear 421*b* may be engaged with the first idle gear 431. Similarly to the first rotary gear part 421, the second rotary gear part 422 may include a central shaft, a second rotary gear, and a wing connecting portion. The second rotary gear of the second rotary gear part 422 may be engaged with the second idle gear 432.

The first idle gear 431 may be disposed between the first rotary gear part 421 and the second idle gear 432, and one side of the first idle gear 431 may be rotatably fastened to a hole formed in the fixing part 441. The second idle gear 432 may be disposed between the first idle gear 431 and the second rotary gear part 422, and one side of the second idle gear 432 may be rotatably fastened to a hole formed in the fixing part 441.

The first wing 411 of the first hinge structure 410 having the above-described structure may be connected to the first rail support part 610, and the second wing 412 of the first hinge structure 410 may be connected to the second rail support part 620. Accordingly, in a case where the angle between the first sliding part 910 connected with the first rail support part 610 and the second sliding part 920 connected with the second rail support part 620 is changed by external pressure, the arrangement of the gears disposed in the first hinge structure 410 may be changed, and the first hinge structure 410 may support the first sliding part 910 and the second sliding part 920 such that the first sliding part 910 and the second sliding part 920 are folded within a specified angle range.

Figure 5:
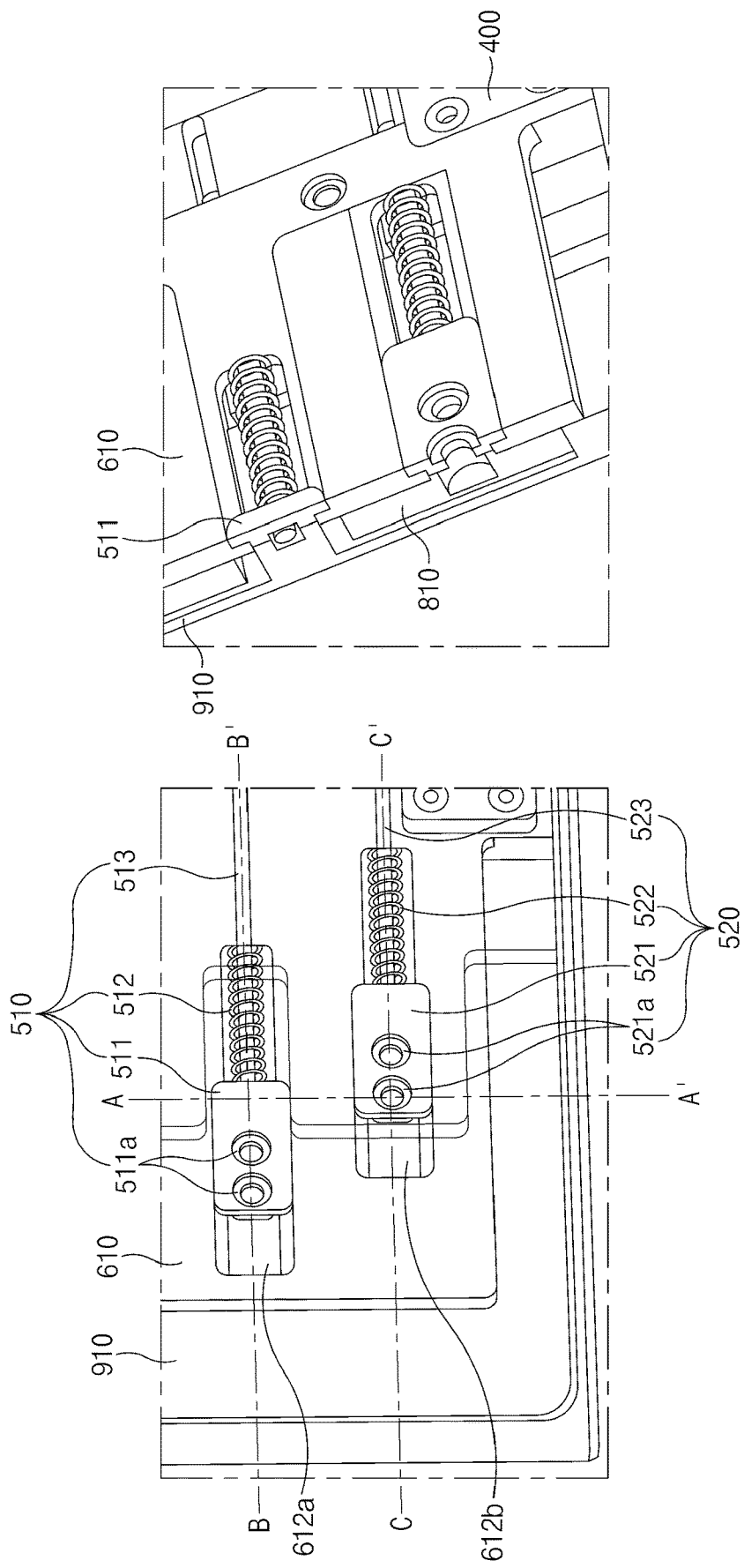
FIG. 5 is a view illustrating one example of a configuration including rail structures of the foldable electronic device according to an embodiment.

FIG. 5 is a view illustrating one example of a configuration including the rail structures of the foldable electronic device according to an embodiment. In FIG. 5, the partial view of the foldable electronic device on the right side is a sectional view of the foldable electronic device taken along line A-A' on the left side.

Referring to FIG. 5, at least part of the foldable electronic device 10 according to an embodiment may include the first sliding part 910, the first rail support part 610, the first bending support part 810, and the hinge structures 400.

As described above, the first mounting portion 612*a* and the second mounting portion 612*b* may be disposed on the first rail support part 610. The first rail structure 510 coupled with the first sliding part 910 may be disposed on the first mounting portion 612*a*, and the second rail structure 520 coupled with the first bending support 810 may be disposed on the second mounting portion 612*b*. Similarly, at least one first mounting portion and at least one second mounting portion may be disposed on the second rail support part 620, the first rail structure 510 coupled with the second sliding part 920 may be disposed on the first mounting portion of the second rail support part 620, and the second rail structure 520 coupled with the second bending support 820 may be disposed on the second mounting portion of the second rail support part 620.

The first rail structure 510 may include a first central rod 513, a first elastic member 512, and a first rail 511. The first central rod 513 may have a circular or polygonal cross-section. One end of the first central rod 513 may be fixedly inserted into a side surface of the first rail 511, and an opposite end of the first central rod 513 may be mounted in a through-hole of the first rail support part 610. The opposite end of the first central rod 513 may be formed to be larger than the through-hole of the first rail support part 610 and may act to prevent the first central rod 513 from falling into the first mounting portion 612*a*. At least part of the first central rod 513 may be located on the first mounting portion 612*a*, and the remaining part may be mounted in a through-hole formed in the rail support part body 611 of the first rail support part 610 and may be temporarily fixed to the outside of the through-hole. The first central rod 513 may be moved in the first mounting portion 612*a* and the through-hole when the first rail 511 moves depending on a movement of the first sliding part 910. The first elastic member 512 may be coupled to an area of the first central rod 513 that is mounted on the first mounting portion 612*a*. The first elastic member 512 may be disposed in the first mounting portion 612*a* and may be mounted on the first central rod 513. At least part of one side of the first elastic member 512 may be brought into contact with one side of the first mounting portion 612*a*, and at least part of an opposite side of the first elastic member 512 may be brought into contact with one surface of the first rail 511. An upper surface and a lower surface of the first rail 511 may have different areas. For example, the first rail 511 may have a hat-shaped cross-section. The first rail 511 may be mounted on the first mounting portion 612*a* and may be disposed to have a height the same as, or similar to, that of a portion around the first mounting portion 612*a*. The first mounting portion 612*a* may have a stepped shape on which the first rail 511 is mounted and moved in one direction. The first rail 511 may be mounted on the step of the first mounting portion 612*a* and may be moved in the one direction along the step of the first mounting portion 612*a*. The first rail 511 may include at least one sliding connection hole 511*a* for coupling with the first sliding part 910. At least one coupling member (e.g., screw) may be inserted into the sliding connection hole 511*a* and may combine the first sliding part 910 and the first rail 511.

The second rail structure 520 may include a second central rod 523, a second elastic member 522, and a second rail 521. Similarly to the first central rod 513, the second central rod 523 may have a circular or polygonal cross-section. One end of the second central rod 523 may be fixedly inserted into a side surface of the second rail 521, and an opposite end of the second central rod 523 may be mounted in and temporarily fixed to a through-hole formed in the rail support part body 611. At least part of the second central rod 523 may be located on the second mounting portion 612*b*, and the remaining part may be mounted in and temporarily fixed to the through-hole formed in the rail support part body 611. The second central rod 523 may be moved in the second mounting portion 612*b* and the through-hole when the second rail 521 moves depending on a movement of the first bending support part 810. The second elastic member 522 may be coupled to an area of the second central rod 523 that is mounted on the second mounting portion 612b. The second elastic member 522 may have a coil spring shape. The second elastic member 522 may be disposed in the second mounting portion 612b and may be mounted on the second central rod 523. The second elastic member 522 may be disposed between one side of the second mounting portion 612b and the second rail 521. Similarly to the first rail 511, the second rail 521 may have a hat-shaped cross-section. The second rail 521 may be fastened to a step formed on the second mounting portion 612b and may move along the step of the second mounting portion 612b depending on a movement of the first bending support part 810. The second rail 521 may include at least one bending connection hole 521a for coupling with the first bending support part 810. At least one coupling member (e.g., screw) may be inserted into the bending connection hole 521a and may combine the first bending support part 810 and the second rail 521.

FIG. 6A is a view illustrating one example of a section of the foldable electronic device taken along line B-B' of FIG. 5.

Referring to FIG. 6A, the foldable electronic device 10 according to an embodiment may include the first sliding part 910, the second sliding part 920, the first support plate 210, the second support plate 220, the third support plate 230, the first rail support part 610, the second rail support part 620, the first bending support part 810, the second bending support part 820, the first hinge housing 300, and the second hinge housing 700.

According to an embodiment, the first rail structure 510 may be disposed on the first rail support part 610 of the foldable electronic device 10. As described above, the first rail structure 510 may include the first central rod 513, the first elastic member 512, and the first rail 511. The first rail structure 510 may further include a first coupling member 511b to combine the first sliding part 910 and the first rail 511. The first coupling member 511b may pass through the sliding connection hole 511a formed in the first rail 511 and may be fastened with one side of the first sliding part 910. Accordingly, the first rail support part 610 may be connected with the first sliding part 910, based on the first rail structure 510. Similarly, the second sliding part 920 may be fastened with the second support plate 220, based on the first rail structure 510.

FIG. 6B is a view illustrating one example of a section of the foldable electronic device taken along line C-C' of FIG. 5.

Referring to FIG. 6B, the foldable electronic device 10 according to an embodiment may include the first sliding part 910, the second sliding part 920, the first support plate 210, the second support plate 220, the third support plate 230, the first rail support part 610, the second rail support part 620, the first bending support part 810, the second bending support part 820, the first hinge housing 300, and the second hinge housing 700.

According to an embodiment, the second rail structures 520 may be disposed on the first rail support part 610 of the foldable electronic device 10. As described above, the second rail structure 520 may include the second central rod 523, the second elastic member 522, and the second rail 521. The second rail structure 520 may further include a second coupling member 521b to combine the first bending support part 810 and the second rail 521. The second coupling member 521b may pass through the bending connection hole 521a formed in the second rail 521 and may be fastened with one side of the first bending support part 810. Accordingly, the first rail support part 610 and the first bending support part 810 may be connected based on the second rail structure 520. Similarly, the second bending support part 820 may be connected with the second support plate 220, based on the second rail structure 520.

Figure 7:
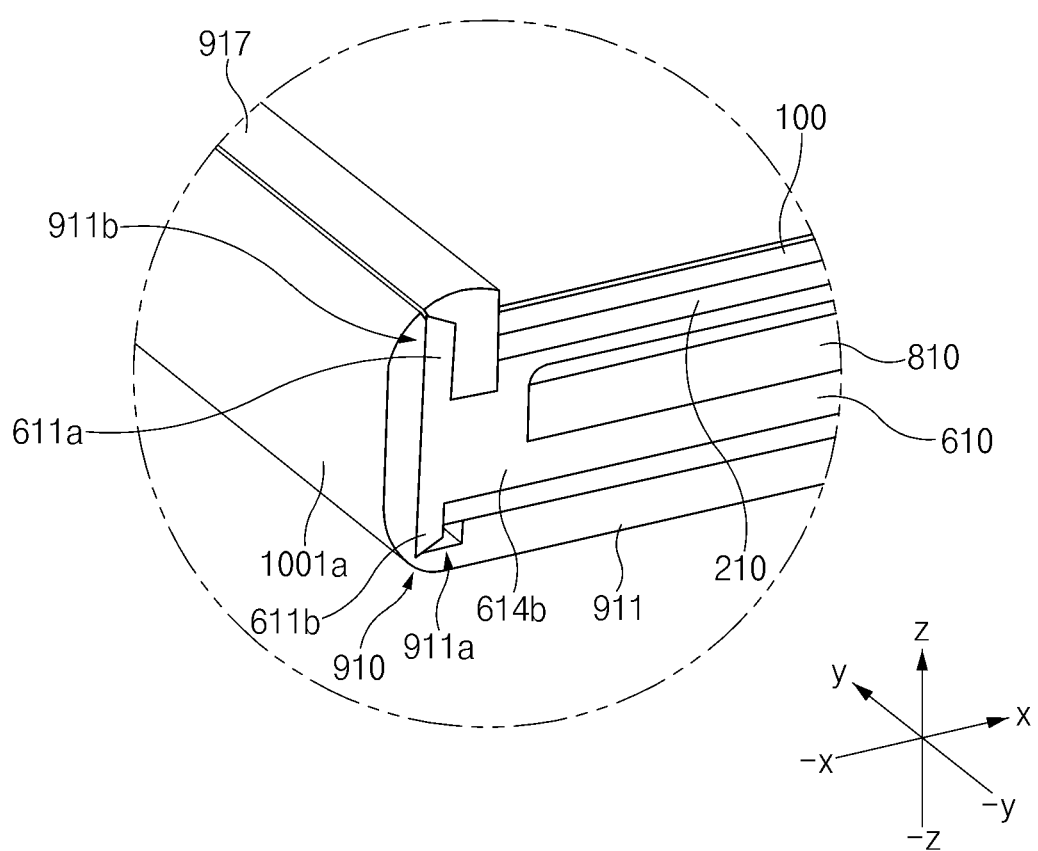
FIG. 7 is a view illustrating one example of part of a section taken along line D-D' of FIG. 6B.

FIG. 7 is a view illustrating one example of part of a section taken along line D-D' of FIG. 6B.

Referring to FIG. 7, the foldable electronic device 10 according to an embodiment may include at least the first sliding part 910, the first rail support part 610, the first bending support part 810, the first support plate 210, and the display 100. The first rail support part 610 may be disposed over the first sliding part 910 (e.g., in the z-axis direction). The first bending support part 810 may be disposed over the first rail support part 610. The first support plate 210 may be disposed over the first bending support part 810. The display 100 may be disposed over the first support plate 210. The section of an edge portion of the second side guard 614b of the first rail support part 610 that faces the −x-axis direction may have the shape of "T". For example, the first rail support part 610 may include the rail support part body 611 and the second side guard 614b, and the second side guard 614b may include an upper rail 611a protruding from an edge of the rail support part body 611 in the z-axis direction and a lower rail 611b protruding from the edge of the rail support part body 611 in the −z-axis direction.

The first sliding part 910 may include, for example, the base plate 911, the side cover 1001a, and a bezel frame 917. A first rail groove 911a in which the lower rail 611b of the second side guard 614b is mounted may be formed on the area where the base plate 911 and the second sidewall 915b meet each other. Alternatively, the base plate 911 may have a step formed on an edge portion thereof, and the first rail groove 911a may be formed by a coupling of the side cover 1001a and the base plate 911. The bezel frame 917 may be provided as part of the second sidewall 915b and may have the shape of "r" (or, the shape of reversed "r"). A second rail groove 911b may be formed between the side cover 1001a and the bezel frame 917, and the upper rail 611a of the second side guard 614b may be disposed in the second rail groove 911b.

The second side guard 614b of the first rail support part 610, which has the above-described structure, may be mounted in the rail grooves 911a and 911b between the side cover 1001 and the first sliding part 910 and may be moved from the y-axis direction to the −y-axis direction. As described above, the foldable electronic device 10 according to an embodiment of the disclosure may include the rail structure inward of the edge of the sliding part on which the edge of the first rail support part 610 is mounted, as well as the rail structure described above with reference to FIG. 5, and the first sliding part 910 and the second sliding part 920 may slide through the first rail support part 610.

Figure 8:
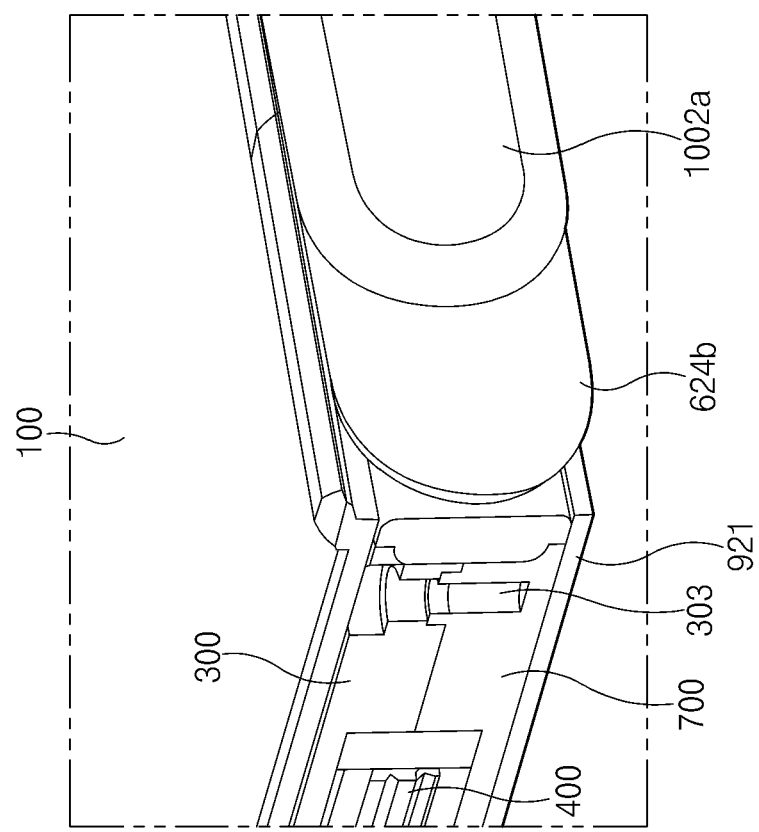
FIG. 8 is a view illustrating one example of part of a section of the foldable electronic device taken along line E-E' of FIG. 6B.
Figure 8:
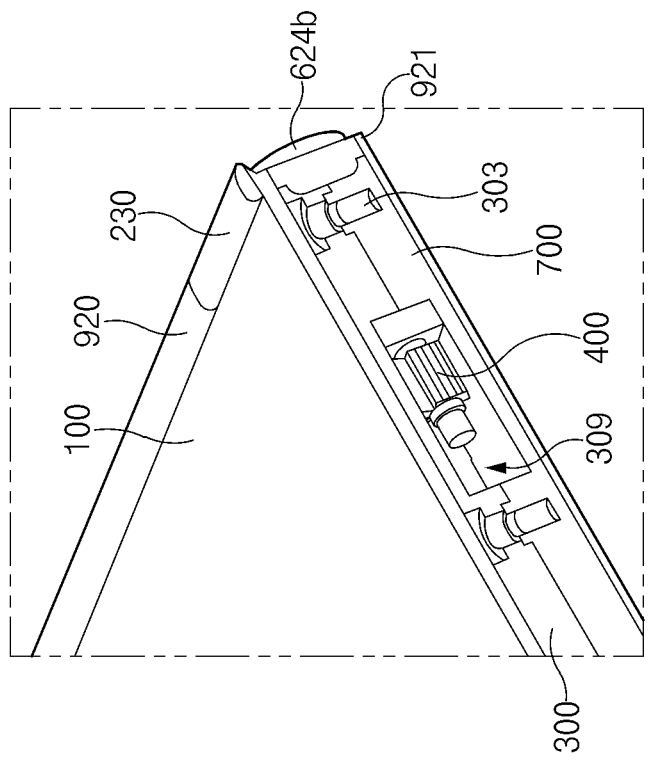

FIG. 8 is a view illustrating one example of part of a section of the foldable electronic device taken along line E-E' of FIG. 6B.

Referring to FIG. 8, according to an embodiment, the foldable electronic device 10 may include the display 100, the second sliding part 920, the third support plate 230, the second side guard 624b of the second sliding part 920, the side cover 1002a, the first hinge housing 300, and the second hinge housing 700.

As illustrated, the first hinge housing 300 and the second hinge housing 700 may be combined with each other and may be disposed in the empty space formed in the central portion of the rail support part 600. Predetermined spaces 309 in which the hinge structures 400 are mounted may be formed in the first hinge housing 300 and the second hinge housing 700. At least part of each of the hinge structures 400 may be disposed in the corresponding space 309. For example, the remaining components (e.g., the first rotary gear part, the second rotary gear part, the first idle gear, and the second idle gear) other than the wings of the hinge structure 400 may be disposed in the space 309. Furthermore, at least one coupling hole 303 may be formed for a coupling of the first hinge housing 300 and the second hinge housing 700. Part of the coupling hole 303 may be formed in the first hinge housing 300, and the remaining part may be formed in the second hinge housing 700. A coupling member may be fixedly inserted into the coupling hole 303 to combine the hinge housings 300 and 700. A base plate 921 of the second sliding part 920 may be disposed under the second hinge housing 700. The third support plate 230 may be disposed over the first hinge housing 300, and the display 100 may be disposed over the third support plate 230.

Figure 9:
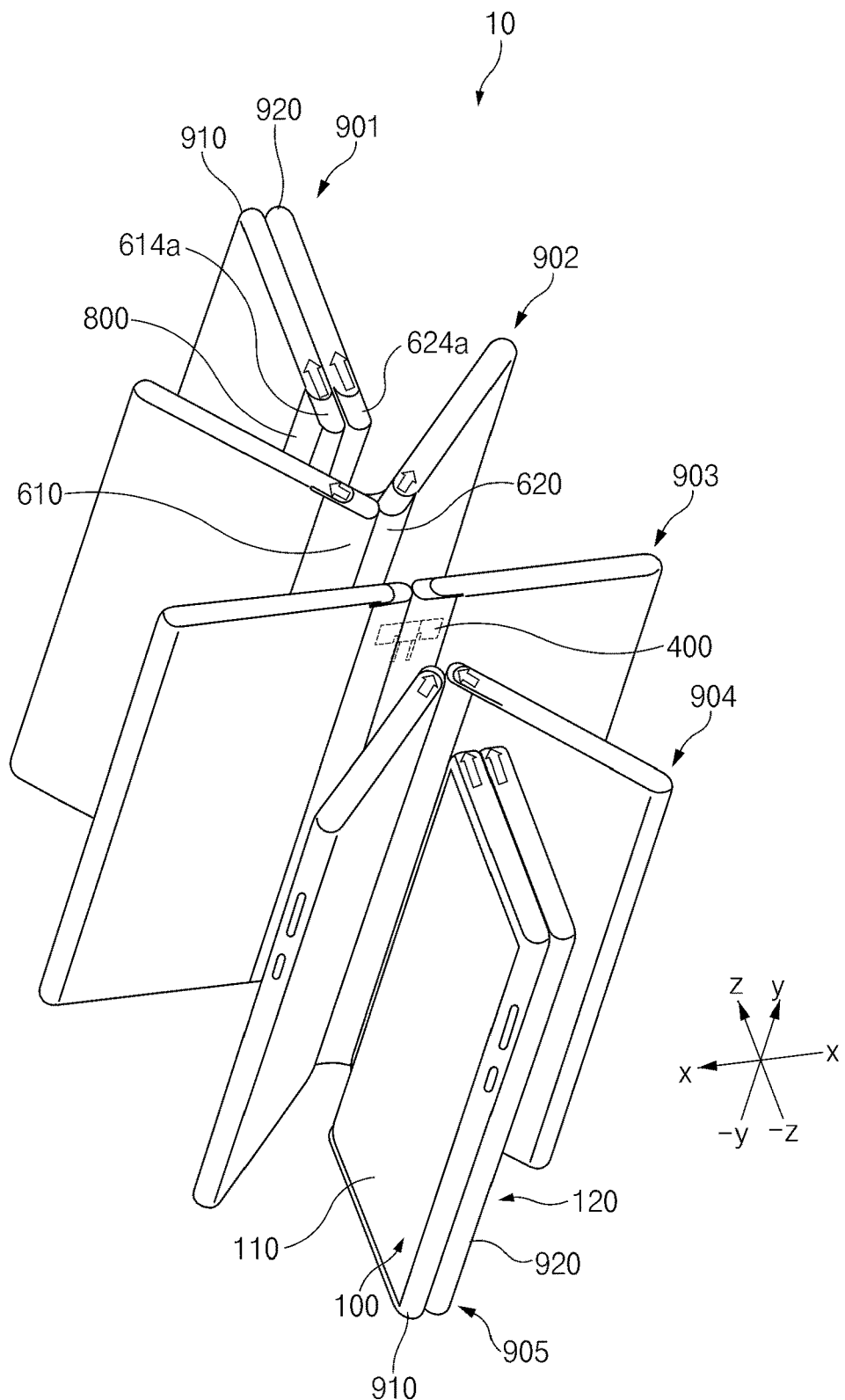
FIG. 9 is a view illustrating various angular arrangements of the foldable electronic device according to an embodiment.

FIG. 9 is a view illustrating various angular arrangements of the foldable electronic device 10 according to an embodiment.

Referring to FIG. 9, the foldable electronic device 10 according to an embodiment may include at least the display 100, the first sliding part 910, the second sliding part 920, the first rail support part 610, the second rail support part 620, the hinge structures 400, and the bending support part 800.

As in state 901, the foldable electronic device 10 having the above-described structure may have an in-folded state in which the first display area 110 and the second display area 120 of the display 100 are disposed to face each other. In this state, the first sliding part 910 and the second sliding part 920 may slide farthest away from the central portion of the foldable electronic device 10. The first wing 411 coupled to the first sliding part 910 and the second wing 412 coupled to the second sliding part 920 may be disposed parallel to each other with respect to the z-axis.

According to certain embodiments, as in state 902, the foldable electronic device 10 may have a state in which the first display area 110 and the second display area 120 of the display 100 form a specified angle (e.g., an angle larger than 0 degrees and smaller than 180 degrees) with respect to the z-axis. For example, the first display area 110 and the second display area 120 may form an angle of 90 degrees therebetween. In this state, the distance by which the first sliding part 910 and the second sliding part 920 move from the central portion of the foldable electronic device 10 may be smaller than that in the in-folded state and may be greater than that in state 903 (e.g., a flat state). In state 902, the third display area 130 of the display 100, for example, may be folded at an angle of 90 degrees.

According to certain embodiments, as in state 903, the foldable electronic device 10 may have a state in which the first display area 110 and the second display area 120 of the display 100 form an angle of 180 degrees with respect to the z-axis. In this state, the first display area 110, the third display area 130, and the second display area 120 may be disposed side by side. For example, the first display area 110, the third display area 130, and the second display area 120 may face the z-axis direction. In state 903, the distance by which the first sliding part 910 and the second sliding part 920 move from the central portion of the foldable electronic device 10 may be greater than that in state 904 (e.g., a state in which the first sliding part 910 and the second sliding part 920 are folded with a specified angle in the −z-axis direction).

According to certain embodiments, as in state 904, the foldable electronic device 10 may have a state in which the first display area 110 and the second display area 120 of the display 100 form an angle greater than 180 degrees and smaller than 360 degrees with respect to the −z-axis. In state 904, the distance by which the first sliding part 910 and the second sliding part 920 move from the central portion of the foldable electronic device 10 may be smaller than that in state 903 (the state in which the display 100 is flat) and may be greater than that in state 905 (an out-folded state in which the first display area 110 and the second display area 120 face away from each other with respect to the −z-axis).

According to certain embodiments, as in state 905, the foldable electronic device 10 may have a state in which the first display area 110 and the second display area 120 of the display 100 face away from each other with respect to the −z-axis, or an out-folded state. In this state, at least part of the first display area 110 may form a right angle with the third display area 130, and at least part of the second display area 120 may form a right angle with the third display area 130. In state 905, the distance by which the first sliding part 910 and the second sliding part 920 move from the central portion of the foldable electronic device 10 may be shortest.

As described above, the foldable electronic device 10 according to an embodiment may operate such that in the in-folded state, the first sliding part 910 and the second sliding part 920 are spaced apart from the central portion of the foldable electronic device 10 by a specified distance, and the first display area 110 and the second display area 120 of the display 100 are folded to face each other. The foldable electronic device 10 may operate such that the first display area 110 and the second display area 120 of the display 100 face away from each other as the first sliding part 910 and the second sliding part 920 move toward the central portion of the foldable electronic device 10. In the in-folded state, the first sliding part 910 and the second sliding part 920 may expose the second side guard 612b of the first rail support part 610 and the second side guard 624b of the second rail support part 620 to the outside by a first area. The exposed areas may be reduced while the foldable electronic device 10 is changed to a flat state or a state in which the angle between the first display area 110 and the second display area 120 is greater than 180 degrees and smaller than 360 degrees. The exposed areas may be minimized in the out-folded state.

Meanwhile, although it has been described that the first display area 110 and the second display area 120 form an angle of 0 degrees (the in-folded state), 90 degrees, 180 degrees (the flat state), 270 degrees, or 360 degrees (the out-folded state), the disclosure is not limited thereto. For example, the foldable electronic device 10 may be mounted such that the first display area 110 and the second display area 120 form an angle of 120 degrees, 300 degrees, or the like.

Figure 10:
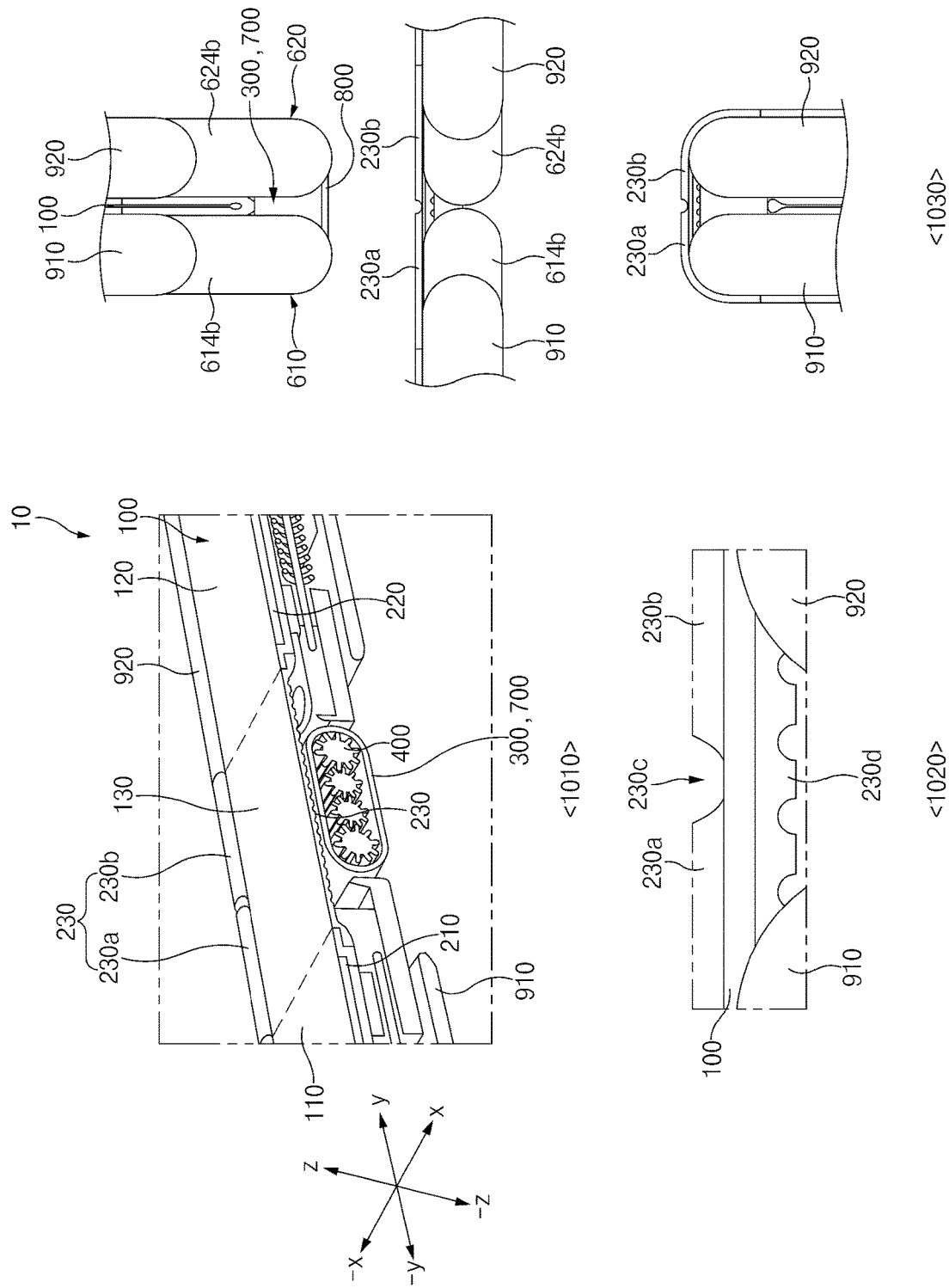
FIG. 10 illustrates various views related to a foldable area of the foldable electronic device according to an embodiment.

FIG. 10 illustrates various views related to a foldable area of the foldable electronic device according to an embodiment. For example, state 1010 includes a central portion of an axis of the foldable electronic device 10 across the y-axis and the −y-axis and represents a section of an area biased in the −x-axis direction. State 1020 represents only part of a peripheral area including the third support plate 230 in state 1010. State 1030 represents states of a central area of the foldable electronic device 10 that is foldable.

Referring to FIG. 10, as in state 1010 and state 1020, the first support plate 210, the second support plate 220, and at least part of the third support plate 230 may be disposed under the display 100. Part of the third support plate 230 may be disposed under the display 100, and another part of the third support plate 230 may be formed to further protrude beyond surroundings to surround a lateral portion of the display 100. In this regard, the third support plate 230 may include a first guard 230a that protects a side surface of part of the first display area 110 and a side surface of part of the third display area 130, and a second guard 230b that protects a side surface of part of the second display area 120 and a side surface of another part of the third display area 130. A folding recess 230c may be located between the first guard 230a and the second guard 230b. When the foldable electronic device 10 is in an in-folded state, the folding recess 230c may prevent the third support plate 230 from being damaged by folding. At least part of the first rail support part 610 may be disposed under the first support plate 210, and at least part of the first sliding part 910 may be disposed under the first rail support part 610. Similarly, at least part of the second rail support part 620 may be disposed under the second support plate 220, and at least part of the second sliding part 920 may be disposed under the second rail support part 620. The hinge housings 300 and 700 may be disposed under a central portion (or, the third display area 130) of the foldable electronic device 10, and the hinge structures 400 may be disposed in the hinge housings 300 and 700. An upper surface (a surface facing the z-axis direction) of an area of the third support plate 230 that is disposed under the display 100 may be formed to be flat, and a lower surface of the area of the third support plate 230 may have a corrugated form, a bumpy form, or a form including at least one groove.

As in state 1030, in an in-folded state (e.g., a state in which the first display area 110 and the second display area 120 face each other), an exposed area of the second side guard 614b (or, the first side guard) of the first rail support part 610 and an exposed area of the second side guard 624b (or, the first side guard) of the second rail support part 620 may have a first size. In a flat state (e.g., a state in which the first display area 110 and the second display area 120 face the same direction (e.g., the z-axis direction)), an exposed area of the second side guard 614b (or, the first side guard) of the first rail support part 610 and an exposed area of the second side guard 624b (or, the first side guard) of the second rail support part 620 may have a second size smaller than the first size. In an out-folded state (e.g., a state in which the first display area 110 and the second display area 120 face away from each other), an exposed area of the second side guard 614b (or, the first side guard) of the first rail support part 610 and an exposed area of the second side guard 624b (or, the first side guard) of the second rail support part 620 may have a third size smaller than the second size, or the second side guard 614b (or, the first side guard) of the first rail support part 610 and the second side guard 624b (or, the first side guard) of the second rail support part 620 may be completely hidden by the first sliding part 910 and the second sliding part 920 (or, may not be exposed).

Figure 11:
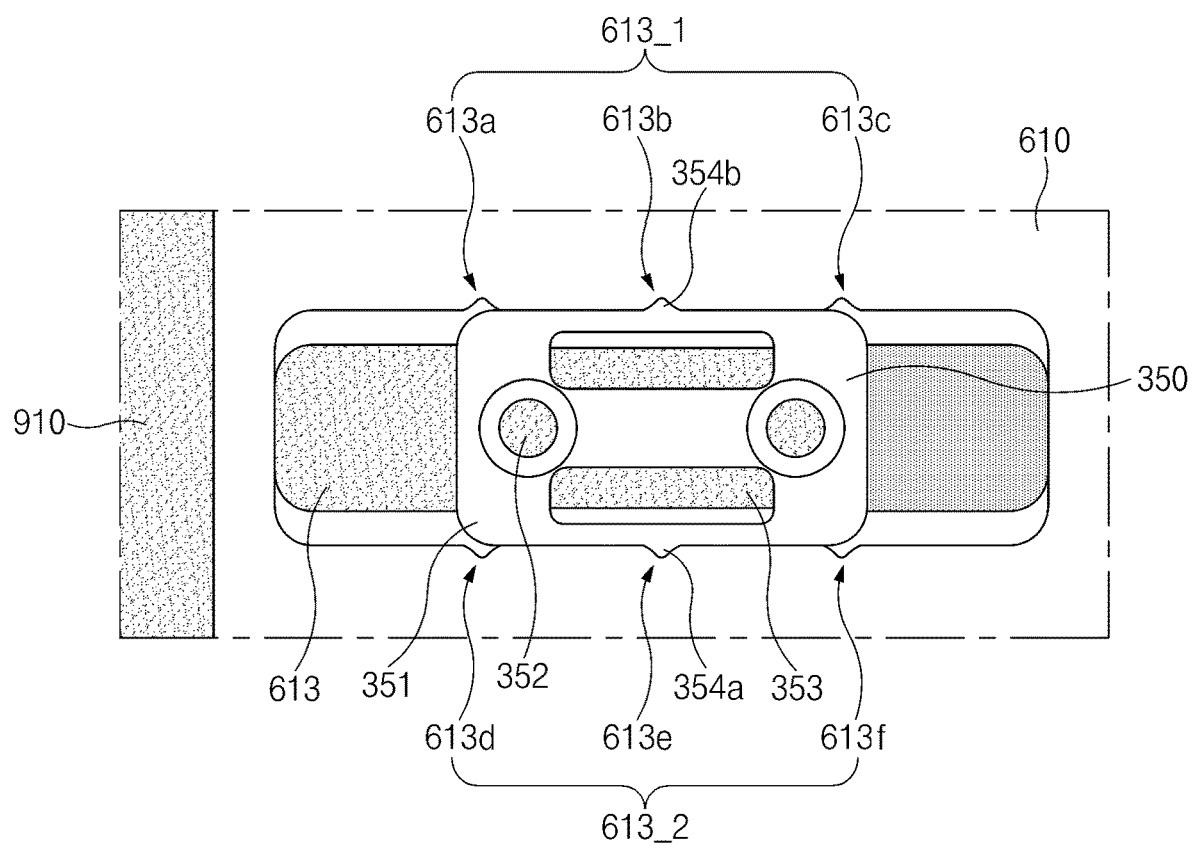
FIG. 11 is a view illustrating one example of a stopper of the foldable electronic device according to an embodiment.

FIG. 11 is a view illustrating one example of the stopper of the foldable electronic device according to an embodiment.

Referring to FIG. 11, the third mounting portion 613 formed in the first rail support part 610 may have a hole shape that is formed in the up-down direction and that has a predetermined length in the left/right direction. A step may be formed on the periphery of the third mounting portion 613. According to an embodiment, the third mounting portion 613 may have a predetermined length and may have a hole shape. The third mounting portion 613 may include a plurality of recesses 613a, 613b, 613c, 613d, 613e, and 613f that are temporarily fastened with protrusions 354a and 354b of the stopper 350 mounted in the third mounting portion 613. For example, the plurality of recesses 613a, 613b, 613c, 613d, 613e, and 613f may be formed on side surfaces of the third mounting portion 613. According to an embodiment, the plurality of recesses 613a, 613b, 613c, 613d, 613e, and 613f may include upper recesses 613_1 that are temporarily fastened with the first protrusion 354b of the stopper 350 disposed in a first direction and lower recesses 613_2 that are temporarily fastened with the second protrusion 354a of the stopper 350 disposed in a second direction opposite to the first direction. Although FIG. 11 illustrates an example that the third mounting portion 613 includes three upper recesses 613_1 and three lower recesses 613_2, the disclosure is not limited thereto. The numbers of upper recesses 613_1 and lower recesses 613_2 and the positions thereof may vary depending on a mounting angle at which the foldable electronic device 10 is temporarily mounted.

The stopper 350 may include a body 351, at least one through-hole 353, coupling holes 352, and the protrusions 354a and 354b. The body 351, for example, may have a size corresponding to the size of the third mounting portion 613 formed in the first rail support part 610. The body 351, for example, may have a hat-shaped cross-section and may be mounted in the third mounting portion 613 having an opening formed through the central portion thereof and the step formed on the periphery thereof. The coupling holes 352 may be located on opposite sides of the body 351. Coupling members may be disposed in the coupling holes 352 and may couple the stopper 350 to the first sliding part 910 (or, the first bending support part 810). The at least one through-hole 353 may be formed in an area of the stopper 350 such that the periphery of the stopper 350 has a predetermined elasticity. For example, the through-hole 353 may be formed on an upper side and a lower side of a central area of the body 351 that is disposed in the horizontal direction with respect to the illustrated drawing. The first protrusion 354b may be disposed at an upper edge of the body 351, and the second protrusion 354a may be disposed at a lower edge of the body 351. The first protrusion 354b and the second protrusion 354a may be disposed to be symmetric to each other with respect to the horizontal direction of the drawing. The protrusions 354a and 354b may be temporarily fastened with the plurality of recesses 613a, 613b, 613c, 613d, 613e, and 613f of the third mounting portion 613. For example, the positions of the recesses with which the protrusions 354a and 354b are fastened may vary depending on a movement of the first sliding part 910 and the second sliding part 920. According to certain embodiments, when the protrusions 354a and 354b are fastened to the recesses 613a and 613b, the foldable electronic device 10 may be in an out-folded state (e.g., a state in which the rear surface of the first sliding part 910 and the rear surface of the second sliding part 920 face each other, a state in which the first sliding part 910 and the second sliding part 920 form an angle of 360 degrees, or state 905 in FIG. 9). When the protrusions 354a and 354b are fastened to the recesses 613b and 613e, the foldable electronic device 10 may be in a state in which the display 100 is flat (e.g., a state in which the first sliding part 910 and the second sliding part 920 are disposed side by side, a state in which the first sliding part 910 and the second sliding part 920 form an angle of 180 degrees, or state 903 in FIG. 9). When the protrusions 354a and 354b are fastened to the recesses 613c and 613f, the foldable electronic device 10 may be in a state in which the display 100 is inwardly folded (e.g., a state in which the front surface of the first sliding part 910 and the front surface of the second sliding part 920 face each other, a state in which the first sliding part 910 and the second sliding part 920 form an angle of 0 degrees, or state 901 in FIG. 9). For a force of less than a specified magnitude, the temporary coupling of the above-described protrusions 354*a* and 354*b* and the recesses may serve to maintain the foldable electronic device 10 in a specific state (e.g., an unfolded state, a flat state, or state 903 in FIG. 9), and for a force of the specified magnitude or more, the temporary coupling may serve to support the first sliding part 910 and the second sliding part 920 such that the first sliding part 910 and the second sliding part 920 can be changed by the force.

Figure 12:
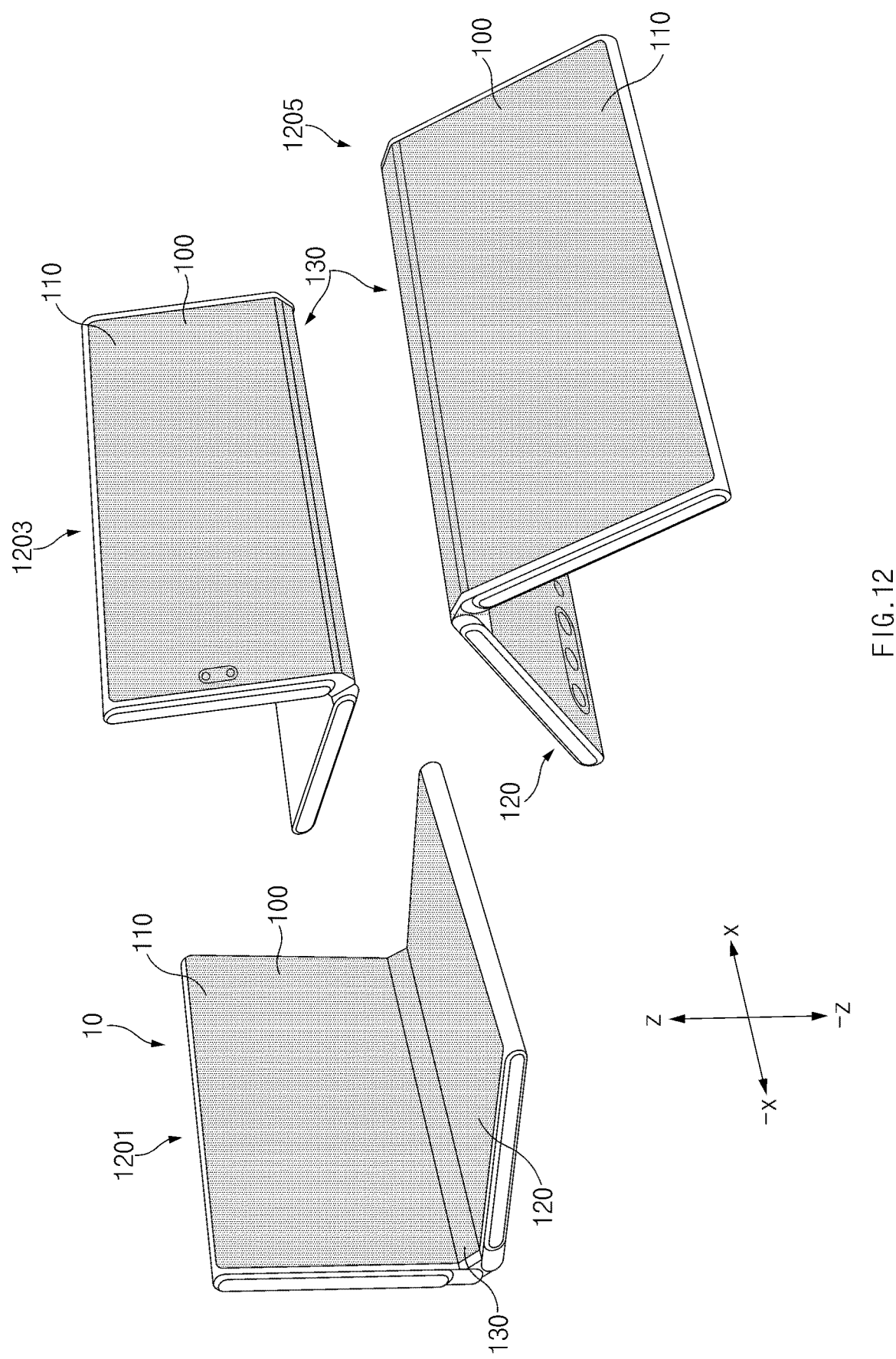
FIG. 12 is a view illustrating various mounting states of the foldable electronic device according to an embodiment.

FIG. 12 is a view illustrating various mounting states of the foldable electronic device according to an embodiment.

Referring to FIG. 12, as in state 1201, the foldable electronic device 10 may be mounted in a laptop mode in which the first display area 110 faces the x-axis direction and the second display area 120 faces the z-axis direction.

As in state 1203, the foldable electronic device 10 may be mounted in a view mode in which the first display area 110 faces one direction between the x-axis and the z-axis and the second display area 120 faces the −z-axis direction. Here, the angle at which the first display 110 and the second display area 120 are mounted may be, for example, 280 degrees, 290 degrees, or the like.

As in state 1205, the foldable electronic device 10 may be mounted in a tent mode in which the first display area 110 faces one direction between the x-axis and the z-axis and the second display area 120 faces one direction between the −x-axis and the −z-axis. In this state, the third display area 130 may face the z-axis direction.

Figure 13:
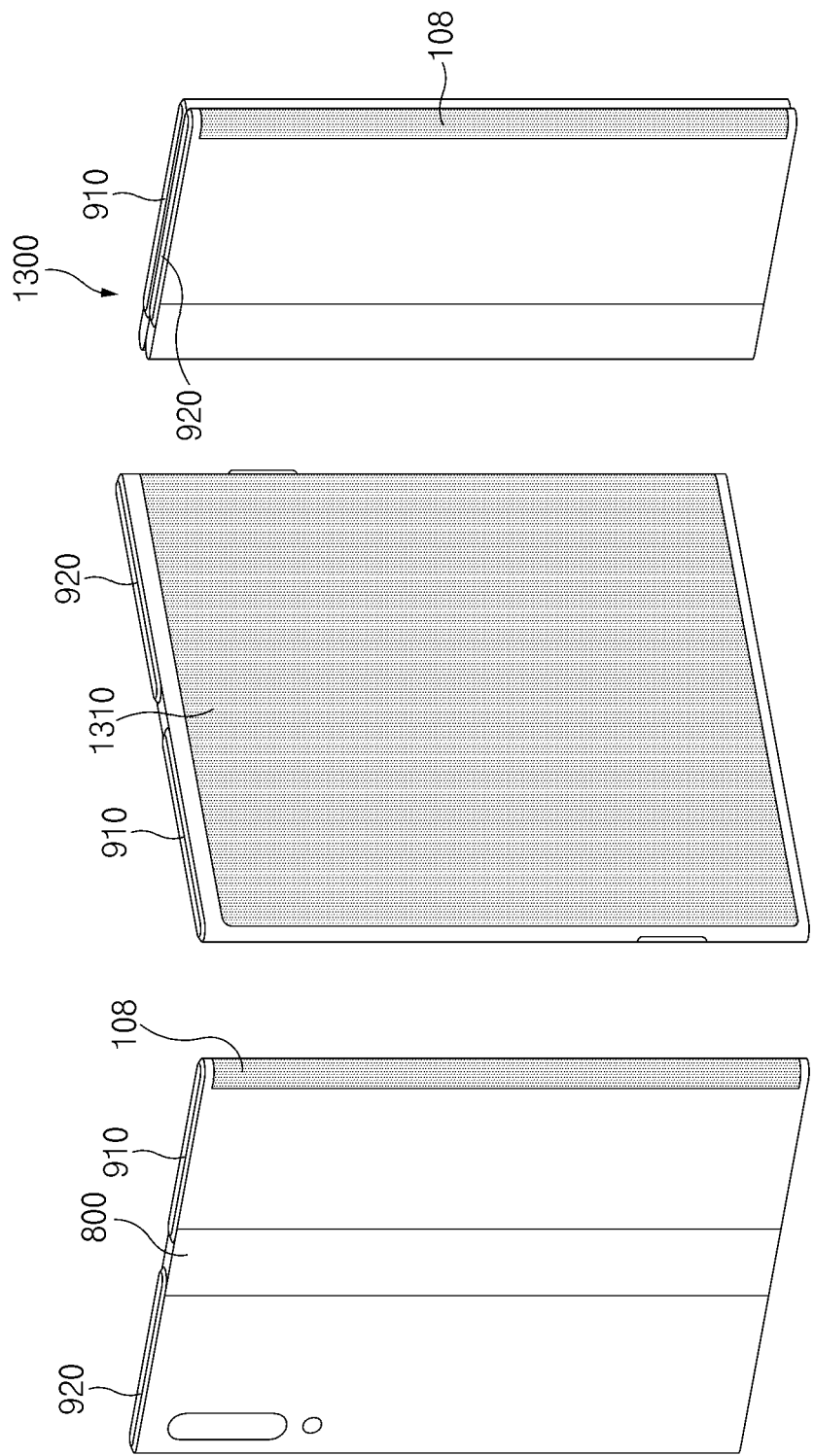
FIG. 13 is a view illustrating another form of the foldable electronic device according to an embodiment.

FIG. 13 is a view illustrating another form of the foldable electronic device according to an embodiment.

Referring to FIG. 13, a foldable electronic device 1300 may include a first sliding part 910, a second sliding part 920, and a bending part 830. The foldable electronic device 1300 may include a display 1310 in a more extended form than the display 100 described above with reference to FIGS. 1 to 12. The extended display 1310 may include, for example, a fourth display area 108 extending to a sidewall of the first sliding part 910. The fourth display area 108 may be disposed so as to be visible from the outside even when the foldable electronic device 1300 is in an in-folded state.

Figure 14:
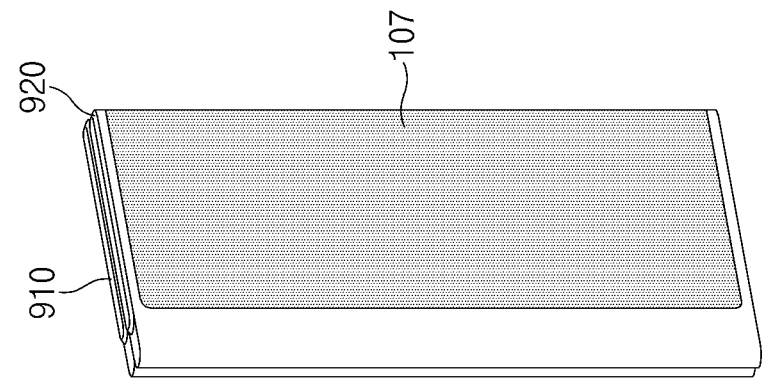
FIG. 14 is a view illustrating another form of the foldable electronic device according to an embodiment.
Figure 14:
Figure 14:
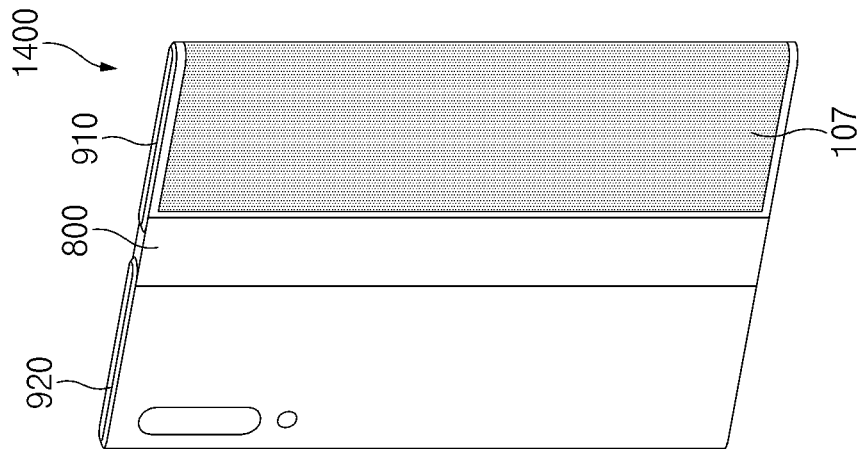

FIG. 14 is a view illustrating another form of the foldable electronic device according to an embodiment.

Referring to FIG. 14, a foldable electronic device 1400 may include a first sliding part 910, a second sliding part 920, and a bending part 830. The foldable electronic device 1400 may include a display 1410 in a more extended form than the displays 100 and 1310 described above with reference to FIGS. 1 to 13. The extended display 1410 may include, for example, a fifth display area 107 extending to at least part of a rear surface of the first sliding part 910. The fifth display area 107 may be disposed so as to be visible from the outside even when the foldable electronic device 1400 is in an in-folded state. The fifth display area 107 may output various pieces of information through a display area wider than the fourth display area 108 described above with reference to FIG. 13.

As described above, a foldable electronic device 10 of the disclosure may include a bending support part 800 that is bent at a plurality of angles, a first sliding part 910 and a second sliding part 920 that are disposed under the bending support part and that slide in symmetrical directions, one surface of the first sliding part and one surface of the second sliding part being disposed to face each other, a rail support part 600 that is disposed over the bending support part and is coupled with the first sliding part and the second sliding part while being coupled with the bending support part and that supports hinge motions and sliding motions of the first sliding part and the second sliding part, a hinge housing 300 and 700 and a hinge structure 400 disposed in a central portion of the rail support part, a support plate 200 placed on the rail support part, and a display 100 placed on the support plate.

According to certain embodiments, the first sliding part 910 may include a base plate 911, a step portion 912 extending from the base plate and having a step thicker than the base plate, a bumpy portion 913 and 914 that extends from the step portion toward the base plate and that is used for coupling with at least the rail support part, a first sidewall 915*a* that forms an upper side surface among side surfaces of the step portion with the base plate, a second sidewall 915*b* that forms a lower side surface among the side surfaces of the step portion with the base plate, and a third sidewall 916 that forms one side surface among the side surfaces of the step portion with the base plate.

According to certain embodiments, the hinge housing 300 and 700 may include a first hinge housing 300 disposed on a central area of the bending support part, at least part of the hinge structure being mounted in the first hinge housing, and a second hinge housing 700 coupled with the first hinge housing, at least the remaining part of the hinge structure being mounted in the second hinge housing.

According to certain embodiments, the foldable electronic device 10 may further include an adhesive member 805 that is disposed on the central area of the bending support part and that fixes the first hinge housing to the bending support part.

According to certain embodiments, the display may include a first display area 110, a second display area 120 disposed such that at least part thereof faces the first display area depending on a folding operation, and a third display area 130 that is disposed between the first display area and the second display area and that is bendable.

According to certain embodiments, the support plate may include a first support plate 210 disposed under the first display area, a second support plate 220 disposed under the second display area, and a third support plate 230 that is disposed under the third display area and is bent depending on a hinge motion.

According to certain embodiments, the foldable electronic device may further include a first adhesive member 103*a* disposed in at least a partial area between the first support plate and a rear surface of the first display area of the display, a second adhesive member 103*b* disposed in at least a partial area between the second support plate and a rear surface of the second display area of the display, and a third adhesive member 103*c* disposed in at least a partial area between the third support plate and a rear surface of the third display area of the display.

According to certain embodiments, the hinge structure 400 may include a first wing 411 connected with the first sliding part, a second wing 412 connected with the second sliding part, a first rotary gear part 421 connected with the first wing, a second rotary gear part 422 connected with the second wing, and a plurality of idle gears 431 and 432 disposed between the first rotary gear part and the second rotary gear part.

According to certain embodiments, the rail support part may include a first rail support part 610, at least part of which is placed on the first sliding part and a second rail support part 620, at least part of which is placed on the second sliding part, the second rail support part being spaced apart from the first sliding part at a specified interval.

According to certain embodiments, the first wing may include a plurality of holes used for coupling with the first rail support part.

According to certain embodiments, the foldable electronic device may further include at least one first rail structure 510 disposed on the first rail support part and coupled with the first sliding part.

According to certain embodiments, the first rail support part may include a first mounting portion 612a on which the first rail structure is mounted and that includes at least part of an opening vertically formed through the first mounting portion to enable a coupling of the first sliding part and the first rail structure.

According to certain embodiments, the first rail structure may include a first rail 511 coupled with the first sliding part, at least part of the first rail being mounted on the first mounting portion, a first central rod 513, in which one side of the first central rod is fixed to the first rail and at least part of an opposite side of the first central rod is disposed on one side of a through-hole connected with the first mounting portion, and a first elastic member 512 located in the first mounting portion and mounted on part of the first central rod.

According to certain embodiments, the foldable electronic device may further include at least one second rail structure 520 disposed on the first rail support part and coupled with the bending support part.

According to certain embodiments, the first rail support part may further include a second mounting portion 612b on which the second rail structure is mounted and that includes at least part of an opening vertically formed through the second mounting portion to enable a coupling of the bending support part and the second rail structure.

According to certain embodiments, the foldable electronic device may further include a third mounting portion 613 that is vertically formed through the rail support part and that has at least one recess formed on a side surface thereof.

According to certain embodiments, the foldable electronic device may further include at least one stopper 350 that is mounted in the third mounting portion and that includes at least one protrusion temporarily fastened with the at least one recess during a sliding motion of the first sliding part and the second sliding part.

According to certain embodiments, the at least one stopper may be coupled with the first sliding part.

According to certain embodiments, the first sliding part and the second sliding part may be moved in directions away from the center of the third display area while the first display area and the second display area are disposed to face each other.

According to certain embodiments, the first sliding part and the second sliding part may be moved in directions toward the center of the third display area while the first display area and the second display area are disposed to face away from each other.

According to the certain embodiments, the foldable electronic device may provide various unfolding angles of the display, thereby enabling the display to be visible in various directions.

According to certain embodiments, a foldable electronic device comprises a bending support part configured to be bent at a plurality of angles; a first sliding part and a second sliding part disposed under the bending support part and configured to slide in symmetrical directions with respect to each other, wherein at least a portion of one surface of the first sliding part and at least a portion of one surface of the second sliding part face each other when the bending support part is bent at one angle; a rail support part disposed over the bending support part and coupled with the first sliding part and the second sliding part and coupled with the bending support part, the rail support part being configured to support hinge motions and guide sliding motions of the first sliding part and the second sliding part; and a display disposed over the first sliding part, the bending support part, and the second sliding part.

According to certain embodiments, the foldable electronic device comprises a hinge housing, wherein the hinge housing includes: a first hinge housing disposed on a central area of the bending support part, at least part of the hinge structure being mounted in the first hinge housing; and a second hinge housing coupled with the first hinge housing, at least the remaining part of the hinge structure being mounted in the second hinge housing.

According to certain embodiments, the display includes: a first display area; a second display area disposed such that at least part thereof faces the first display area when the bending support is bent at the one angle; and a third display area disposed between the first display area and the second display area, the third display area being bendable.

According to certain embodiments, the first sliding part and the second sliding part are moved in directions away from the center of the third display area while the first display area and the second display area are disposed to face each other.

According to certain embodiments, the first sliding part and the second sliding part are moved in directions toward the center of the third display area while the first display area and the second display area are disposed to face away from each other.

According to certain embodiments, the foldable electronic device further comprises a support plate, and wherein the support plate includes: a first support plate disposed under the first display area; a second support plate disposed under the second display area; and a third support plate disposed under the third display area, the third support plate being bent depending on a hinge motion.

According to certain embodiments, the hinge structure includes: a first wing connected with the first sliding part; a second wing connected with the second sliding part; a first rotary gear part connected with the first wing; a second rotary gear part connected with the second wing; and a plurality of idle gears disposed between the first rotary gear part and the second rotary gear part.

In addition, the disclosure may provide various effects that are directly or indirectly recognized.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that certain embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Certain embodiments of the disclosure may be implemented by software (e.g., the program 1140) including an instruction stored in a machine-readable storage medium (e.g., an internal memory 1136 or an external memory 1138) readable by a machine (e.g., the electronic device 1101). For example, the processor (e.g., the processor 1120) of a machine (e.g., the electronic device 1101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one or plural entities. According to certain embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to certain embodiments, operations performed by a module, a programming, or other components may be executed sequentially, in parallel, repeatedly, or in a heuristic method, or at least some operations may be executed in different sequences, omitted, or other operations may be added.

Each component (e.g., a module or a program) according to certain embodiments may be composed of single entity or a plurality of entities, a part of the above-described sub-components may be omitted, or other sub-components may be further included in certain embodiments. Alternatively or additionally, after being integrated in one entity, some components (e.g., a module or a program) may identically or similarly perform the function executed by each corresponding component before integration. According to certain embodiments, operations executed by modules, program, or other components may be executed by a successive method, a parallel method, a repeated method, or a heuristic method, or at least one part of operations may be executed in different sequences or omitted. Alternatively, other operations may be added.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
    a bending support part configured to be bent at a plurality of angles;
    a first sliding part and a second sliding part disposed under the bending support part and configured to slide in symmetrical directions with respect to each other, wherein at least a portion of one surface of the first sliding part and at least a portion of one surface of the second sliding part face each other when the bending support part is bent at one angle;
    a rail support part disposed over the bending support part and coupled with the first sliding part and the second sliding part and coupled with the bending support part, the rail support part being configured to support hinge motions and guide sliding motions of the first sliding part and the second sliding part; and a display disposed over the first sliding part, the bending support part, and the second sliding part.

2. The foldable electronic device of claim 1, wherein the first sliding part includes:
    a base plate;
    a step portion extending from the base plate and having a step thicker than the base plate;
    a bumpy portion extending from the step portion toward the base plate, the bumpy portion being used for coupling with at least the rail support part;
    a first sidewall configured to form an upper side surface among side surfaces of the step portion with the base plate;
    a second sidewall configured to form a lower side surface among the side surfaces of the step portion with the base plate; and
    a third sidewall configured to form one side surface among the side surfaces of the step portion with the base plate.

3. The foldable electronic device of claim 1, further comprising a hinge housing and a hinge structure disposed in a central region of the rail support part, wherein the hinge housing includes:
- a first hinge housing disposed on a central area of the bending support part, at least part of the hinge structure being mounted in the first hinge housing; and
- a second hinge housing coupled with the first hinge housing, at least a remaining part of the hinge structure being mounted in the second hinge housing.

4. The foldable electronic device of claim 3, further comprising:
- an adhesive member disposed on the central area of the bending support part and configured to fix the first hinge housing to the bending support part.

5. The foldable electronic device of claim 1, wherein the display includes:
- a first display area;
- a second display area disposed such that at least part thereof faces the first display area when the bending support is bent at the one angle; and
- a third display area disposed between the first display area and the second display area, the third display area being bendable.

6. The foldable electronic device of claim 5, wherein the first sliding part and the second sliding part are moved in directions away from a center of the third display area while the first display area and the second display area are disposed to face each other.

7. The foldable electronic device of claim 5, wherein the first sliding part and the second sliding part are moved in directions toward a center of the third display area while the first display area and the second display area are disposed to face away from each other.

8. The foldable electronic device of claim 5, further comprising a support plate, and wherein the support plate includes:
- a first support plate disposed under the first display area;
- a second support plate disposed under the second display area; and
- a third support plate disposed under the third display area, the third support plate being bent depending on a hinge motion.

9. The foldable electronic device of claim 8, further comprising at least one of:
- a first adhesive member disposed in at least a partial area between the first support plate and a rear surface of the first display area of the display;
- a second adhesive member disposed in at least a partial area between the second support plate and a rear surface of the second display area of the display; or
- a third adhesive member disposed in at least a partial area between the third support plate and a rear surface of the third display area of the display.

10. The foldable electronic device of claim 1, further comprising a hinge housing and a hinge structure disposed in a central region of the rail support part, wherein the hinge structure includes:
- a first wing connected with the first sliding part;
- a second wing connected with the second sliding part;
- a first rotary gear part connected with the first wing;
- a second rotary gear part connected with the second wing; and
- a plurality of idle gears disposed between the first rotary gear part and the second rotary gear part.

11. The foldable electronic device of claim 10, wherein the rail support part includes:
- a first rail support part, at least part of which is placed on the first sliding part; and
- a second rail support part, at least part of which is placed on the second sliding part, the second rail support part being spaced apart from the first sliding part at an interval.

12. The foldable electronic device of claim 11, wherein the first wing includes a plurality of holes used for coupling with the first rail support part.

13. The foldable electronic device of claim 11, further comprising:
- at least one first rail structure disposed on the first rail support part and coupled with the first sliding part.

14. The foldable electronic device of claim 13, wherein the first rail support part includes:
- a first mounting portion on which the first rail structure is mounted, the first mounting portion including at least portion of an opening vertically formed through the first mounting portion to enable a coupling of the first sliding part and the first rail structure.

15. The foldable electronic device of claim 14, wherein the first rail structure includes:
- a first rail coupled with the first sliding part, at least part of the first rail being mounted on the first mounting portion;
- a first central rod, wherein one side of the first central rod is fixed to the first rail, and at least part of an opposite side of the first central rod is disposed on one side of a through-hole connected with the first mounting portion; and
- a first elastic member located in the first mounting portion and mounted on part of the first central rod.

16. The foldable electronic device of claim 14, further comprising:
- at least one second rail structure disposed on the first rail support part and coupled with the bending support part.

17. The foldable electronic device of claim 16, wherein the first rail support part further includes:
- a second mounting portion on which the second rail structure is mounted, the second mounting portion including at least portion of an opening vertically formed through the second mounting portion to enable a coupling of the bending support part and the second rail structure.

18. The foldable electronic device of claim 1, further comprising:
- a third mounting portion vertically formed through the rail support part, the third mounting portion having at least one recess formed on a side surface thereof.

19. The foldable electronic device of claim 18, further comprising:
- at least one stopper mounted in the third mounting portion, the at least one stopper including at least one protrusion temporarily fastened with the at least one recess during a sliding motion of the first sliding part and the second sliding part.

20. The foldable electronic device of claim 19, wherein the at least one stopper is coupled with the first sliding part.

\* \* \* \* \*